(12) United States Patent
Colton et al.

(10) Patent No.: US 7,634,502 B2
(45) Date of Patent: Dec. 15, 2009

(54) SYSTEM AND METHOD FOR IMPROVED CONTENT DELIVERY

(76) Inventors: Paul Colton, 7985 Sendero de Oro, San Diego, CA (US) 92127; Nicolas Nierenberg, 9494 La Jolla Farms Rd., La Jolla, CA (US) 92037; David Harper Peckham, 84 Montrose, Irvine, CA (US) 92620

( * ) Notice: Subject to any disclaimer, the term of this patent is extended or adjusted under 35 U.S.C. 154(b) by 623 days.

(21) Appl. No.: 11/042,532

(22) Filed: Jan. 24, 2005

(65) Prior Publication Data

US 2006/0167940 A1    Jul. 27, 2006

(51) Int. Cl.
*G06F 17/30* (2006.01)
(52) U.S. Cl. .................. 707/104.1; 382/232
(58) Field of Classification Search ............. 707/101, 707/104.1; 382/166, 232
See application file for complete search history.

(56) References Cited

U.S. PATENT DOCUMENTS

| | | | |
|---|---|---|---|
| 5,003,307 A | | 3/1991 | Whiting et al. |
| 5,579,430 A | | 11/1996 | Grill et al. |
| 5,632,031 A | | 5/1997 | Velissaropoulos et al. |
| 5,664,182 A | | 9/1997 | Nierenberg et al. |
| 5,748,780 A | * | 5/1998 | Stolfo ............... 382/232 |
| 6,216,152 B1 | | 4/2001 | Wong et al. |
| 6,654,765 B2 | | 11/2003 | Wong et al. |
| 6,912,522 B2 | | 6/2005 | Edgar |
| 6,965,897 B1 | | 11/2005 | Chen |
| 7,032,154 B2 | * | 4/2006 | Kidorf et al. ........ 714/755 |
| 7,177,931 B2 | * | 2/2007 | Athey et al. ......... 709/225 |
| 2002/0035571 A1 | | 3/2002 | Coult |
| 2002/0099853 A1 | * | 7/2002 | Tsujii et al. ......... 709/247 |
| 2003/0028890 A1 | * | 2/2003 | Swart et al. ......... 725/91 |
| 2003/0080977 A1 | | 5/2003 | Scott et al. |
| 2003/0084106 A1 | * | 5/2003 | Erev et al. ........... 709/206 |
| 2003/0113027 A1 | * | 6/2003 | Chan et al. .......... 382/240 |
| 2003/0185247 A1 | | 10/2003 | Chen et al. |
| 2004/0005044 A1 | | 1/2004 | Yeh |
| 2004/0054691 A1 | | 3/2004 | Sharma et al. |
| 2004/0054692 A1 | | 3/2004 | Seyrat et al. |
| 2004/0076232 A1 | * | 4/2004 | Akiyama et al. ..... 375/240.08 |
| 2004/0139336 A1 | * | 7/2004 | McLean et al. ...... 713/189 |
| 2004/0172402 A1 | | 9/2004 | Jabri et al. |
| 2004/0186841 A1 | | 9/2004 | Heuer et al. |
| 2004/0190784 A1 | | 9/2004 | Ozawa et al. |
| 2006/0177114 A1 | | 8/2006 | Tongdee et al. |

* cited by examiner

*Primary Examiner*—Leslie Wong
(74) *Attorney, Agent, or Firm*—Clause Eight IPS; Elaine H. Lo; Michael Catania

(57) ABSTRACT

A system and method for sharing content among a plurality of users, enables the transfer of electronic content items captured by any of a variety of electronic content devices. The content item can include multiple levels of encoding to facilitate efficient transfer across a communication medium. The content item can be decoded at a recipient device to allow playback, display or other utilization of the content item. Content-specific encoding can be applied to enhance the transportability of the content. A content sharing application can be provided to facilitate content transfer in a computing environment, and can be implemented so as to provide an e-mail like user interface.

3 Claims, 15 Drawing Sheets

SYSTEM AND METHOD FOR IMPROVED CONTENT DELIVERY

BACKGROUND OF THE INVENTION

1. Field of the Invention

The present invention generally relates to content delivery, and more specifically to a system and method for improved content delivery over a communication channel.

2. Description of the Related Art

Advances in the electronics industry have enabled contemporary society to enjoy numerous electronic content devices that help to make our lives more productive, more comfortable, and more efficient. Such devices include, for example, notebook computers, personal digital assistants (PDAs), cell phones, computer printers, DVD recorders/players, MP3 players, digital cameras, scanners, camcorders, and a multitude of other portable electronic content devices.

Many of these electronic content devices can be utilized to provide some form of media content to the user. For example, current digital camera offerings afford users the ability to capture still and motion images, many with the ability to capture sound as well. Digital cameras, as well as other electronic content devices including as those mentioned above, provide users with the option of downloading and storing the captured content onto their personal computing device. Many users, even those who do not consider themselves to be computer savvy, regularly create and store content on their computers. Most of these users even e-mail such content to friends, family, coworkers and others.

Since the introduction of these electronic content devices, their popularity has been ever increasing. For example, it is estimate that over 100 million digital cameras were sold in the 2003-2004 timeframe. Thanks at least in part to Moore's Law, these devices are now able to capture content at a faster rate and at higher levels of quality. For example, when first introduced, early digital cameras captured images with image sensors having 640×480 resolution or less. Today, consumer-grade digital cameras can be found with four to six megapixel image sensors at affordable price points. The prosumer market is flush with six to eight megapixel cameras, and the professional market offers 12 megapixels on up. To top it off, these numbers are not stagnant, but instead are increasing rapidly.

To maximize use of these electronic content devices, it is often desirable that users have the ability to share content among devices or with other users. Following the above-described example of digital cameras, it is widely believed that the primary reason the majority of users take photographs and movies (digital or otherwise) is to preserve the memories captured in the content. Of course, other reasons for capturing content on cameras and other electronic content devices include capturing the content for artistic purposes, as a hobby, for entertainment, for business and professional uses, and so on.

Regardless of the reason for capturing the content, however, it is almost always the case that users wish to share the captured content with others. With digital images, for example, users often wish to e-mail these images to friends, family, co-workers or other users. Unfortunately, while advances in technology have led to higher quality images, they have also led to larger file sizes. This has led to scenarios where demand for communication bandwidth is outpacing the availability of increased bandwidth. Even with currently available compression techniques, still images, for example, commonly range in size from 500 kilobytes to three or four megabytes, and sometimes larger. Compounding the problem, users typically want to send multiple files in a single communication.

Not only is the bandwidth of the communication channel a consideration, but also the constraints imposed by other infrastructure elements. For example, with e-mail communications, constraints of the e-mail server, limitations set by the internet service provider, and other limitations can impede the ability of users to share content as desired. As a result, many email messages remain undelivered due to the large size of the one or more attachments included with the message.

SUMMARY OF THE INVENTION

The present invention is directed toward systems and methods for providing improved sharing and delivery of content among a plurality of users who communicate with one another via a communication medium. In accordance with various embodiments of the invention, the content shared among the users can include, for example, media content, data content, information content, and other content that is preferably organized into one or more files that can be identified by one or more file types. For example, the content shared among users can include content types such as digital images, motion pictures or videos, audio information, text files, data files, and other information and content types.

In accordance with one embodiment of the invention, the content to be shared among the users is encoded using a content-specific encoding mechanism to enhance the transportability of the content across the communication medium. For example, in one embodiment, the encoding can comprise algorithms for compression of the content to decrease the file size of the content to be transferred across the communication medium. To further enhance the transportability of the media content across the communication medium, this content-specific encoding can be performed in addition to or on top of another step of encoding performed on the content. Thus, for example, content-specific encoding can be performed on content that is already compressed using an alternative encoding algorithm. As such, in this example, the content-specific encoding can further compress the media content, thus allowing improved transportability across the communication medium.

At the recipient's end, content-specific decoding can be performed to recover a representation of the content that was transported to the recipient via communication medium. In embodiments where two levels of encoding are performed on the original content, the processes at the recipient's end of the communication medium can include the complementary decoding algorithms for both of the encoding algorithms used at the sender's end. Thus, a representation of the content can be recovered by the recipient, who can now use the content as desired.

Preferably, content-specific encoding and decoding algorithms are selected so as to be well suited to one or more particular types of content. Thus, it may be desirable to select the content-specific encoding with an understanding of how it applies to the type of content being encoded so as to improve the results achieved by the encoding process. The selection can take into consideration factors such as, for example, levels of compression, level of lossyness or losslessness in the encoding/decoding process, available bandwidth, and other relevant parameters. A few examples of content-specific codecs include MPEG codecs for motion videos, JPEG and Wavelet codecs for still images, ZIP and LZW algorithms for text files, among others. Thus, in one embodiment, a content-specific codec can be one that is designed for (perhaps even optimized for), or works well with, a particular type or types of content items.

In one embodiment, communication of the encoded content can be accomplished using conventional e-mail delivery methods. Alternatively, in another embodiment, delivery of the content can be accomplished using one or more special purpose servers. While the special purpose servers are not necessarily dedicated servers, they include software or other functionality to enable transferring the content in accordance with the one or more embodiments described herein. For example, a server can be included to accept content carrying messages from a sending user and route those messages to one or more designated recipients. The server can be implemented, if desired, with constraints placed on message size relaxed or even eliminated, thus diminishing or removing the size barrier often found in some conventional e-mail servers. Thus, this is one way the use of a content server can allow greater flexibility in delivery of messages to one or more recipients.

In accordance with one example embodiment, original content is captured via an electronic content device. The electronic content device can perform a first level of encoding on the content captured, thereby providing some measure of compression. This compressed content can be further encoded using a content-specific encoding module to obtain further compression of the original content. This further compressed content is then transferred across a communication medium to one or more recipients.

At the recipient's end, the appropriate decoding algorithms can be implemented such that the recipient can access the desired content. For example, complementary decoding algorithms to those used to encode the content can be applied at the recipient's end to allow access to the recovered content. Alternatively, one or more specific decoding algorithms that are not necessarily complementary can be implemented at the recipient's end to accommodate the one or more playback or access devices that the recipient may have access to. For example, assume the original content is a digital photograph captured by a digital camera as the electronic content device. Further assume that the digital camera encodes the image using a JPEG encoding algorithm. Also assume that the content-specific encoding module further compresses the JPEG image using Wavelet encoding, and this further compressed content is now transferred across the communication medium to the recipient.

To view the image on a device that is capable of displaying JPEG encoded images, recipient's application can be implemented to first perform the Wavelet decoding to recover a representation of the JPEG coded image that is now accessible by the recipient's playback device (which could include, for example, the recipient's computer or digital camera or other playback device). As such, this JPEG image can now be decoded and displayed by the recipient's content device. In this example, the decoding algorithms are complementary with their respective encoding algorithms.

Assume, however, that the recipient has a more recent playback device that enables playback of images in a Wavelet encoded format. In this example, the first step of content-specific decoding is not required to be performed by the recipient's application in that the content can be provided directly to his or her playback device in which the appropriate decoding will be performed.

As another example, assume that the original content is a motion video captured and encoded using MPEG encoding and formatted for playback via a Quicktime® player. Further assume that the recipient does not have a Quicktime® player and wishes to playback the video using another form of player such as, for example, the Windows Media Player®. In this example, the recipient's application can perform the appropriate decoding and format the material for playback via his or her Windows Media Player®.

In accordance with yet another embodiment of the invention, a content sharing application can be implemented to identify one or more content components that may be included in a content item, and apply content-specific encoding to one or more of these components to thereby enhance the encoding of the content overall. For example, the original content may comprise a document file that includes text, graphics, and audio components. In accordance with this embodiment of the invention applied to this example, the content sharing application can be implemented to identify the content type of each of these components and apply the appropriate encoding schemes to optimize or enhance the overall compression of the document file.

The invention can be implemented such that some or all of the decoding and encoding schemes can provide lossless, or perceptibly lossless, encoding and decoding to enhance the quality of the recovered content at the recipient's end. In one embodiment, options can be provided to users such that a level of losslessness can be selected enabling the user to make an appropriate trade-off between reproduction quality and transferability.

In implementations using one or more servers to facilitate the transfer of content, the server can be implemented with varying levels of functionality depending on the number of factors such as system specifications and requirements, processing capabilities of the one or more users, and available bandwidth across the communication medium. For example, if a sending user has limited processing capability but a relatively large bandwidth available, one or more of the content encoding steps can be performed at the server as opposed to on the user's computing device. In this example, the user would consume more bandwidth transmitting the images across the communication medium to the server; however, he or she would conserve processing resources at his or her computing device. As another example, the server can be implemented to generate and transmit alternative forms of content to the one or more recipients instead of forwarding the compressed content generated by the sending user. For example, if the sending user wishes to send digital images to a recipient, upon receipt of this message the server can generate thumbnails of the original images and forward the thumbnails to the recipient, thus allowing the recipient to choose from among the thumbnails which of the original images he or she wishes to receive. As a further example, the server can be implemented to convert a motion video file into alternative formats for delivery to a recipient. Such alternative formats can include, for example, converting the original media clip into a streaming video or converting the media strip into a particular media viewer format (such as the Quicktime/Windows example above).

In yet another embodiment, the server can be implemented to send an informational message to the recipient separate from the actual content delivery message. For example, a server can be implemented to send an e-mail or other message to the recipient informing the recipient that he or she has content from a user that is awaiting transfer. This information message can include attributes of the message such as, for example, an identification of the sender, an identification of the content items, an identification of the content types, and other information as may be deemed useful or relevant. In the example described above where a server can create alternative formats such as, for example, thumbnail images, these thumbnails (or other alternative content types) can be included with this information message to better inform the recipient of the content awaiting transfer.

In an embodiment where a separate informational message is provided, the recipient can respond to this message to accept transfer of the actual content from the server. This can be implemented to allow the recipient to select from among a plurality of content items that the sender has designated for the recipient. Thus, this dual-message approach can, for example, be used as a way to filter the content transmitted by the content server and received by the recipient. Additionally, this embodiment can be implemented so as to allow the recipient to designate content types or other preferences used in delivery of the content to the recipient.

In accordance with yet another embodiment, the invention can be implemented so as to allow automatic or semi-automatic account creation for one or more users. For example, a sending user may generate a content message and send it to a designated recipient who is not known by the content server. In this embodiment, the content server can be implemented so as to provide an introductory message to the intended recipient along with instructions to the recipient on how to install any applications that may be useful in receiving the designated content. For example, in one implementation, the server can send an e-mail message to the recipient with this information. The e-mail message can include, for example, a text-based web link, a button, icon or other item that the recipient can click to download and install any useful applications that will enable the user to receive the content sent by the original sender.

Along with installing any associated software, the server can collect useful information and enable the creation of an account (in systems where accounts are utilized to manage various users) for the recipient. As such, in accordance with this embodiment, a user can send a content message to a recipient without having to first determine whether the recipient has the necessary software installed on his or her machine and can send this message using the recipient's conventional e-mail address, which is used by the server to deliver the installation instructions (which in one embodiment is simply a text-based web link, button, icon or other item) to the recipient. Likewise, upon receipt of the introductory message, the recipient can, with little effort, download and install any appropriate software and begin receiving content from the sending user.

In accordance with yet another embodiment of the invention, one or more graphical user interfaces (GUIs) can be provided to give the application or applications a desired look and feel. For example, in one implementation, the GUIs used provide the application with a look and feel similar to that of conventional e-mail applications. As such, a new user to the system can become easily acclimated to the dialog boxes provided to enable the management, transmission, and receipt of various content items. Of course, other looks and feels can be produced and provided, as it is not necessary that the application have the look and feel of an e-mail application.

In accordance with yet another embodiment, the invention can be implemented so as to allow synchronization of files among a plurality of users. In this embodiment, the invention can be implemented to provide an automatic or semi-automatic updating of one or more files associated with a synchronization family. Thus, for example, content changes made to one file in a family can be made to one or more of the other files in that same synchronization family depending on the characteristics attributed to that synchronization family. For example, a synchronization family may be established wherein content items added to one folder are subsequently added to each of the other folders in a synchronization family. As a further example, additions, deletions, or other modifications to one or more folders in a synchronization family may be designated as being applied in one direction only between one or more of the folders.

BRIEF DESCRIPTION OF THE DRAWINGS

The present invention is described herein in conjunction with the following drawings. These drawings are provided to facilitate description of selected aspects, embodiments and features of the invention, and thus do not limit the scope of the claimed invention.

DESCRIPTION OF THE PREFERRED EMBODIMENTS

The present invention is directed toward an improved system and method for delivery of media content via a communication medium. In one embodiment, the improved delivery can be accomplished by performing a content-specific encoding to the media content prior to transferring that content over the communication medium. This content-specific encoding may be in addition to encoding that may already have been performed by the electronic content device. As such, a more efficient transfer of the media content can be accomplished than typically would have been accomplished prior to the content-specific encoding.

Figure 1:
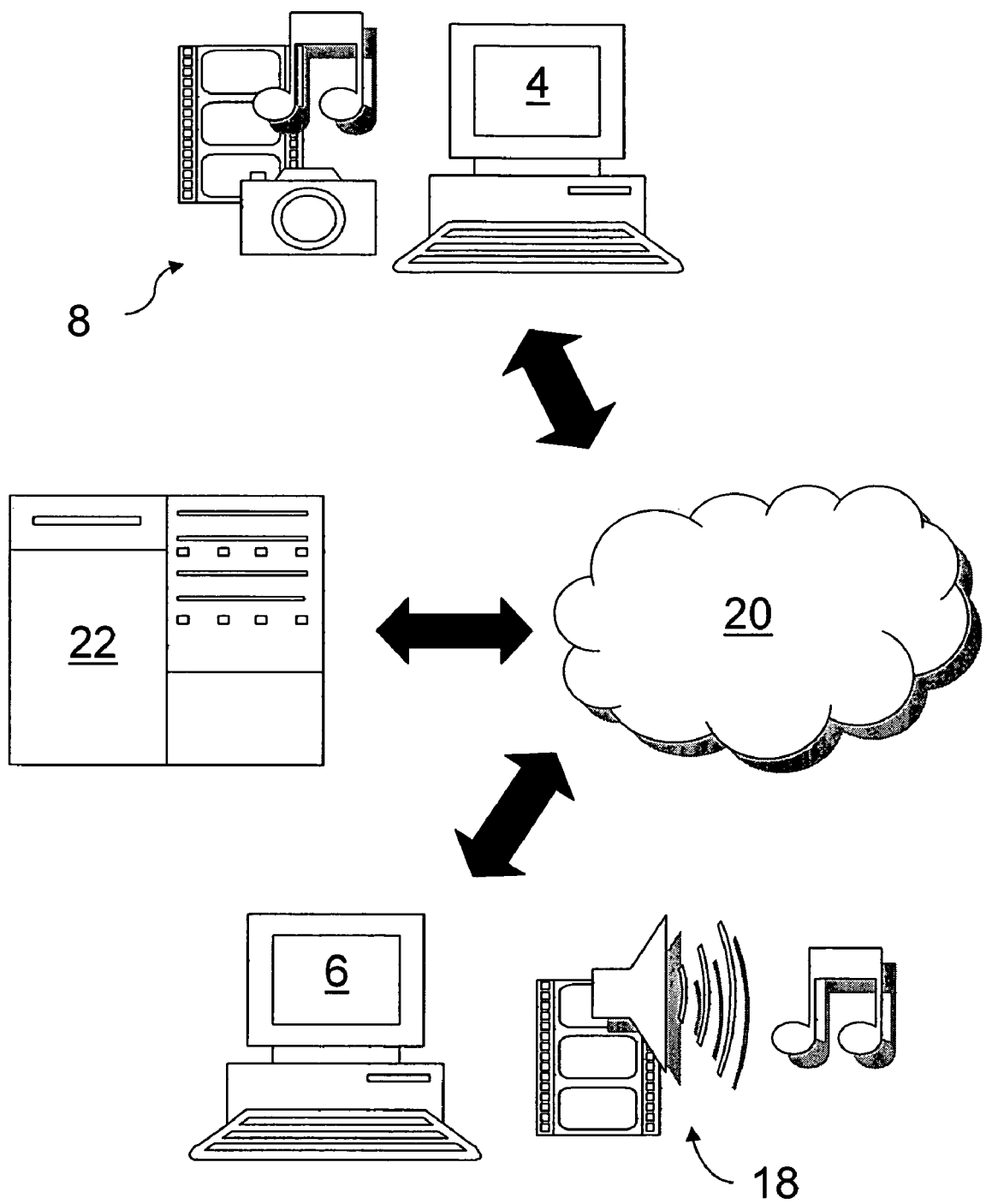
FIG. 1 is a diagram illustrating an example implementation of an improved media content delivery system in accordance with one embodiment of the invention.

FIG. 1 is a diagram illustrating an example implementation of an improved media content delivery system in accordance with one embodiment of the invention. Referring now to FIG. 1, in this example implementation, a first user has available a form of media content 8 that the first user wishes to send via a communication medium 20 to a recipient. Media content 8 can be any of a variety of forms of media content, and preferably comprises digital or digitized media. Examples of digital or digitized media content 8 can include digital photographs, digital music, digital movies or video, documents in various formats, and the like. In this embodiment, media content 8 can be captured using an electronic content device such as, for example, a digital camera, digital camcorder, scanner or other capture device (not illustrated). These electronic content devices typically capture the desired content (e.g., music for audio recording, a scene for photographing, etc.) and digitize the content so that it can be efficiently handled by the first user's computing device 4. As used herein, the term "digital" is not limited to a binary representation of the content, but instead can encompass binary, m-ary and other data representations of the original content.

In the example implementation illustrated in FIG. 1, the first user utilizes a computing device 4 to prepare the media content 8 for delivery to one or more second users. Computing devices 4 and 6 can be implemented using any of a number of different computing devices such as, for example, laptop or desktop computers, workstations, PDAs, cell phones, and other computing devices configured to perform (via hardware, software, firmware, or any combination thereof) the functions and operations attributable to them as described herein.

Communication medium 20 is illustrated as a network cloud; however, after reading this description, it will become apparent to one of ordinary skill in the art how communications in accordance with the present invention can be accomplished over any of a variety of communication channels including, for example, the Internet, an intranet or extranet network, other wide or local area networks, point-to-point communication channels, and various other communication media, whether wired or wireless. A server 22 can be optionally included as illustrated in the example implementation provided by FIG. 1. Server 22 can be used to perform various functions such as, for example, content routing, content encoding, and content decoding. These as well as additional features and functionality that can be included with a server 22 are further described in the various embodiments set forth below.

Server 22 can be implemented utilizing an e-mail server, or a special-purpose server. Servers are commonly dedicated, in that they perform no other tasks besides their designated server tasks. In many instances, however, a single server can execute several programs, or perform multiple different functions at once. The term special-purpose server, as used herein, can be but is not limited to a dedicated server, but can be implemented as a server capable of performing alternative functions and executing alternative programs. Also the term server as used herein can refer to one or more programs or modules running on a computer or computing system as well as the computer or computing system itself.

Upon receipt of the content, the receiving user can utilize his or her computing device 6 to receive a file representing original media content 8, which file can be reconstituted such that the reconstituted content 18 can be enjoyed by the receiving user. Preferably, the techniques utilized to encode and decode the content for delivery are implemented as lossless or perceptibly lossless techniques such that enjoyment of the reconstituted content 18 is enhanced. Lossy techniques can also be used, and selection of the various techniques may depend on factors such as content type, user preferences, available bandwidth and so on.

Figure 2:
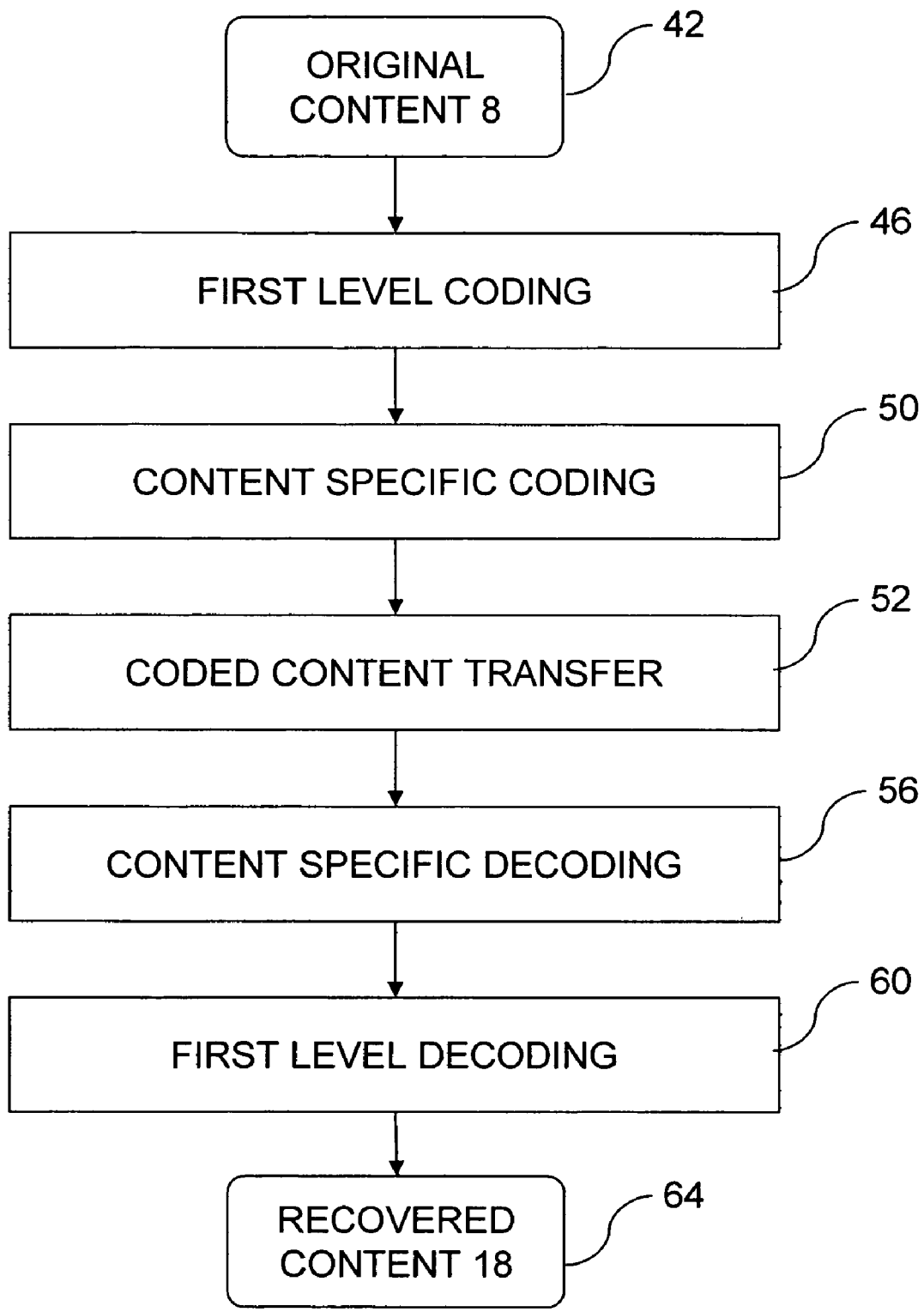
FIG. 2 is an operational flow diagram illustrating one example process by which original media content can be transferred across a communication medium in accordance with one embodiment of the invention.

Having thus described an example implementation of the invention, it is now useful to describe a process by which transfer of media content 8 can be accomplished in accordance with one embodiment of the invention. FIG. 2 is an operational flow diagram illustrating one such example process by which original media content 8 can be transferred in accordance with one embodiment of the invention. Referring now to FIGS. 1 and 2, in a step 42 original media content 8 is captured by or for a first user. Captured media content 8 can be stored in a memory, a disk, a drive, or other storage device or medium, such as, for example, those storage devices associated with electronic content devices or computing device 4.

As discussed above, original media content 8 can be any of a number of different content types such as, for example, digital media content. For ease of description, this exemplary process is described in terms of an application in which the original media content 8 is a digital video clip captured, for example, by a digital camera in the "movie mode," by a digital video recorder or by an analog recorder and subsequently digitized. After reading this description, it will become apparent to one of ordinary skill in the art how to implement the invention utilizing alternative types and forms of original media content 8.

In a step 46, a first level encoding of original media content 8 can be performed. This step of first level encoding can be performed by the media content capture device such as, for example, standard encoding routines that a capture device may use like MP3 encoding for audio files, JPEG encoding for image files, and MPEG encoding for video files. Continuing with the current example in which original media content 8 is a digital video clip, this first level of encoding that can be performed by the digital camera or camcorder that captured the video clip can include MPEG encoding. For example, many digital video capture devices currently implement MPEG-2 encoding for video compression. Of course, it is also possible that original media content 8 is captured by the electronic content device without any encoding. For example, this can be accomplished when a digital camera is utilized to capture a raw image.

Oftentimes, however, the original encoding algorithms applied to original media content 8 does not encode the original media content 8 to a level that may be desirable for effective communication across communication medium 20. For example, where the encoding algorithms are compression routines, the original encoding process may not adequately compress the original content item 8. Therefore, in a step 50, the present invention performs content-specific encoding to the media content item. The content-specific encoding performed in step 50 can provide additional encoding above and beyond that which was applied in step 46, thereby further improving the content for transmission. Following the example where encoding is performed for purposes of compression, the content-specific encoding step may be implemented to apply further compression (e.g., better optimized compression) to the content item.

The inclusion of this content-specific encoding in step 50 may be particularly beneficial in situations where new encoding algorithms have become available in the marketplace and they are not utilized in step 46 (e.g., by the electronic content device that was originally used to capture original media content 8). Returning again to the example where original media content 8 is a digital video clip; as described in that example, the digital video clip was captured utilizing MPEG video encoding. Assume for this discussion that the electronic content device that captured that video clip is a few years old, and only provides MPEG-2 encoding. More recently, however, MPEG-4 video encoding has become available and provides a greater level of compression than was generally accomplished utilizing MPEG-2, while still preserving content viewability. Thus, the original media content 8 captured by the electronic content device and encoded utilizing MPEG-2 coders is not optimized for transmission to one or more recipients across the communication medium 20. Following this example, in this case content-specific encoding (step 50) can comprise the application of MPEG-4 encoding to the digital video clip that was originally captured and stored utilizing MPEG-2 encoding. As such, gains in compression may be made over that which was accomplished by the first level encoding.

In a step 52, this coded content is transferred across communication medium 20 to a recipient second user. In one embodiment, this can be accomplished as a point-to-point communication or other direct communication. However, in the example implementation illustrated in FIG. 1, this communication is made by way of server 22. In this example implementation, server 22 can be utilized to receive the coded content from computing device 4 and provide the coded content for delivery to or retrieval by one or more recipients. Examples of how this can be accomplished are described in further detail below.

In a step 56, content-specific decoding is performed. Preferably, content-specific decoding is performed at the recipient's computing device 6 in such a manner so as to allow the transfer of the content from computing device 4 to computing device 6 to be accomplished utilizing both levels of compression as described with reference to steps 46 and 50. Additionally, there may be a second step of content decoding 60 depending on the playback devices utilized by the recipient.

Returning to the above example wherein a digital video clip was encoded utilizing MPEG-2 encoding in step 46 and subsequently encoded using MPEG-4 encoding in step 50. Following this example, content-specific decoding 56 can be implemented utilizing MPEG-4 decoding algorithms to enable recovery of the content in MPEG 2 encoded form, and first level decoding 60 can be implemented utilizing appropriate MPEG 2 decoding algorithms to facilitate playback of the digital video clip. It is possible that use (for example, playback or viewing) of the content by the recipient can be made using recipient's computing device 6 or an electronic content device. Following the example of the video clip, the recipient can cause the playback of the video clip to occur on his or her computing device 6 such as, for example, utilizing the Quicktime® media player, Windows® medial player or other media playback device. With this example, it is also possible that the video clip be played back on an electronic content device such as, for example, a video recorder/player. In this embodiment, it is desirable that at least content-specific decoding, and possibly first level decoding, be performed on computing device 6. Of course, either or both levels of decoding can be performed at another device such as, for example, an electronic content device.

Figure 3:
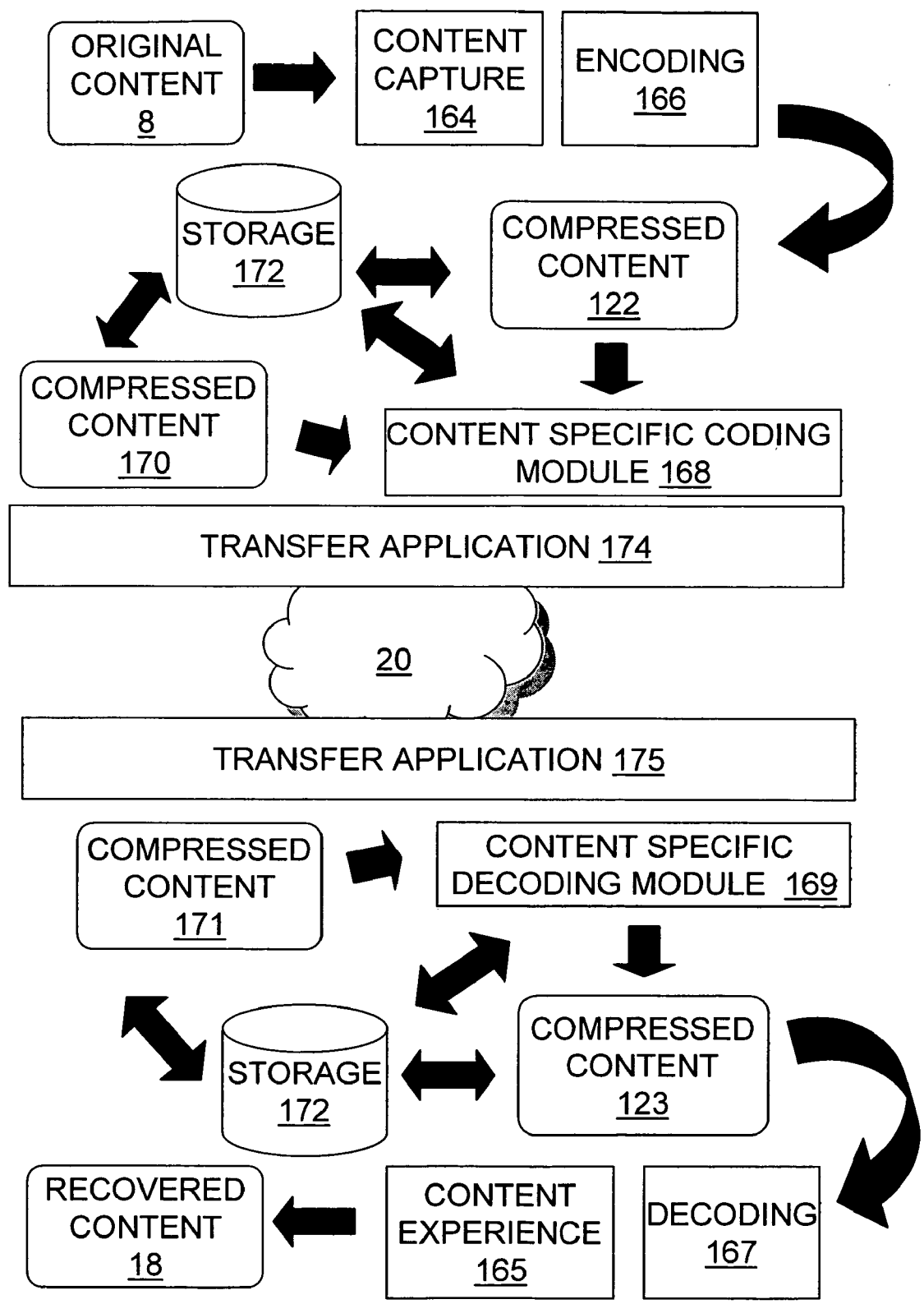
FIG. 3 is a block diagram illustrating an example architecture that can be implemented to accomplish some of the features and functionality that can be included in accordance with one embodiment of the invention.

FIG. 3 is a block diagram illustrating an example architecture that can be implemented to accomplish some of the features and functionality that can be included in accordance with one embodiment of the invention. After reading this description, it will become apparent to one of ordinary skill in the art how alternative architectures can be implemented to accomplish the same or similar objectives. Referring now to FIG. 3, as discussed above, original media content 8 is captured, typically by an electronic content device. This is illustrated via a content capture module 164. Content capture module 164 can be implemented within computing device 4; however, it can also be implemented in an electronic content device capable of capturing media content 8 such as, for example, a digital camera, video recorder, or other content capture device. Examples of a content capture module 164 that can be implemented within (or associated with) a computing device 4 include, for example, such capture devices as a scanner, a DVD recorder, a CD burner, and other capture devices. As additional examples, many computing devices 4 are equipped with cameras and microphones, along with associated hardware and software, to capture video and audio data utilizing computing device 4.

Encoding module 166 can be included to provide the first level encoding of original media content 8. Encoding module 166 can be, and typically is, associated with the content capture device to provide the first level encoding. This can be the case whether computing device 4 or another electronic content device is the content capture device. Following the example of a digital video clip discussed above with reference to FIG. 2, encoding module 166 can be implemented utilizing an MPEG encoder within a digital camera or digital video recorder. It is also possible that encoding module 166 be included with computing device 4, even where an external capture device is utilized. As a result of the operation of encoding module 166, compressed content 122 is created. Compressed content 122 can be stored in a storage device such as, for example storage device 172, which can be implemented, for example, as a memory, disc, or other storage medium or device preferably accessible by computing device 4.

A content-specific encoding module 168 is also included in the illustrated embodiment. Content-specific encoding module 168 can be included to provide further encoding of compressed content 122. This further encoding is desirable in that it can be implemented to result in a greater level of compression of the media content such that this content can be more efficiently or suitably sent across communication medium 20.

As one example, assume that the original media content 8 is a scene that is captured by a digital still camera (having a content capture module 164) and encoded utilizing an encoding module 166 associated within the digital still camera, wherein encoding module 166 encodes the image utilizing JPEG encoding techniques. Thus, in this example, compressed content 122 is a JPEG file that can be stored in a memory device associated with the digital camera (e.g., compact flash card, memory stick, or other like storage device), or stored in or at computing device 4. In this example, content-specific encoding module 168 can apply wavelet encoding to the compressed content 122 to create compressed content 170 resulting in further compression gains. As a result, in this example the file size is further reduced prior to transfer across communication medium 20.

As illustrated in FIG. 3, a transfer application 174 is also included and is preferably running on computing device 4 to effectuate the transfer of the compressed content. Compressed content 170 can also be stored in a storage device 172, typically accessible by transfer application 174. Transfer application 174, upon a request to transmit the content, retrieves compressed content 170 and sends it across communication medium 20. Alternatively, rather than performing content-specific encoding on compressed content 122 in advance of a request to transfer the content across communication medium 20, content-specific encoding can be performed 'on the fly' when a request is made, for example, by a user to send the content across communication medium 20. Thus, for example, when a user requests a transfer of content, transfer application 174 can be invoked which, in turn, can invoke content-specific encoding module 168 to provide the content-specific encoding, thereby creating compressed content 170, which can be transferred across communication medium 20.

In the embodiment illustrated in FIG. 3, a similar architecture is provided at the recipient's end of the communication medium. Although the architectural components illustrated herein need not have both the transfer and receive functionality incorporated therein, for ease of use and simplified implementation, it is contemplated that they would have both the transfer and receive functionality. At the recipient's end, transfer application 174 receives compressed content 170 via communication medium 20. In one embodiment, compressed content 170 can be received directly from the sending application, or via a server such as, for example, server 22 illustrated in FIG. 1.

Upon receipt of compressed content 170, transfer application 174 can invoke content-specific decoding module 169 to decode compressed content 170, thereby creating compressed content 123, which in one embodiment is a recreation or recovery of compressed content 122. Compressed content 123 and compressed content 170 can be stored utilizing a storage device 173, which can be implemented, for example, as a memory, disc, or other storage medium or device preferably accessible by computing device, or in another storage location. Compressed content 123 can be further decoded utilizing a decoding module 167 such that recovered content 18 can be utilized (for example, played back, viewed, listened to, etc.) by the recipient. Thus, using content-specific encoding to further enhance an encoded media content compression 170 techniques can be used to reduce the bandwidth otherwise required to transmit content across communication medium 20.

One of the examples utilized above involved a digital still image that was encoded using JPEG encoding at content capture module 164 and wavelet encoding at content-specific encoding module 168. Returning to this example, content-specific decoding module 169 can be invoked so as to recover compressed content 122 using appropriate wavelet decoding algorithms, and decoding module 167 can be implemented to apply the appropriate JPEG decoding such that a representation of the original media content 8 can be recovered in the form of recovered content 18. This example scenario assumes that recipients' decoding capabilities mirror those encoding techniques used by the sender. However, this is not always the case. For example, the recipient's capabilities may be different from or even more advanced than those of the sender. As further illustration of this example, assume that recipient has a playback device that allows viewing of wavelet encoded images, and desires to view the images using this playback device. In this example, content-specific decoding can be performed by the playback device and need not be performed by the recipient's computing device 6. Thus, the invention can be implemented to accept preferences and settings indicating levels and types of decoding desired by the recipient for various different types of media content.

Figure 4:
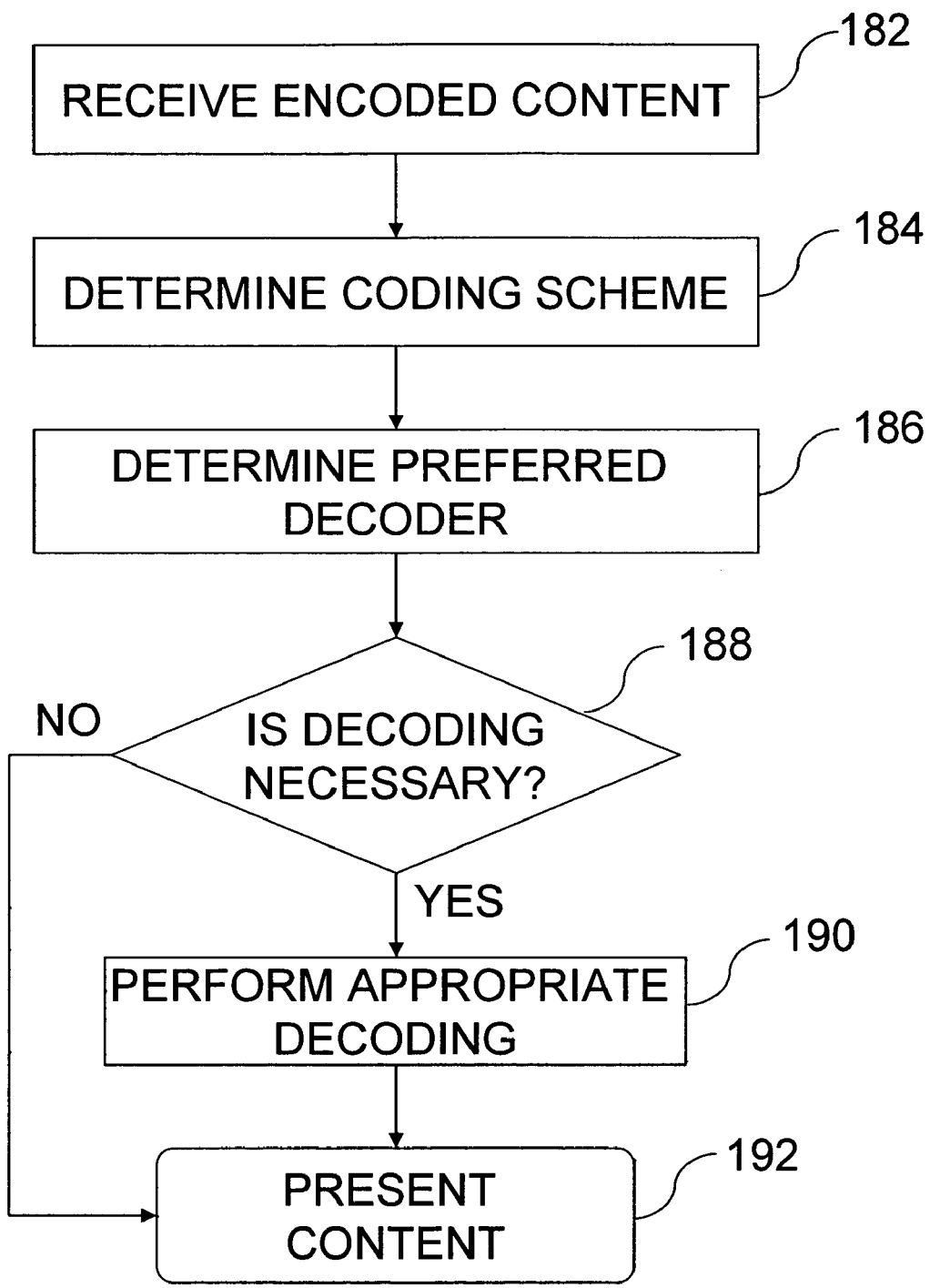
FIG. 4 is an operational flow diagram illustrating an exemplary process by which content decoding can be performed in accordance with one embodiment of the invention.

FIG. 4 is an operational flow diagram illustrating an exemplary process by which content decoding can be performed in accordance with one embodiment of the invention. Referring now to FIG. 4, in a step 182 the encoded content is received by transfer application 174. In one embodiment, encoded content received by transfer application 174 is compressed content 170, which has been compressed utilizing first-level and content-specific encoding techniques.

In a step 184, transfer application 174 determines the encoding scheme that was utilized to create compressed content 170. This can be accomplished, for example, by checking file types or attributes associated with compressed content 170. Alternatively, this information can be provided by the sender, for example via the sender's transfer application 174. As yet another alternative, in implementations where a server 22 is utilized to facilitate the transfer of compressed content 170, this information can be provided by server 22.

In a step 186, content-specific decoding module 169 determines the preferred decoder to use for recovering the original content. This can be accomplished by considering the encoding algorithms used to encode original media content 8 as well as decoding algorithms 167 that may be available to computing device 6 or with the intended electronic content device to be utilized to playback or otherwise access the content. For example, where original media content 8 is a digital video clip that was encoded via encoding module 166 utilizing an MPEG-2 encoding algorithm and further encoded by content-specific encoding module 168 utilizing an MPEG-4 encoding algorithm, the recipient's playback device may have an MPEG-4 codec incorporated therein such that it can decode video clips coded utilizing MPEG-4 compression techniques. As such, it may not be necessary for content-specific decoding module 169 to perform the MPEG-4 decoding.

Thus, in a step 188, content-specific decoding module 169 (or transfer application 174) can determine whether decoding is necessary or useful. If not, the content (in this case, compressed content 170) can be presented to the playback device as illustrated by a step 192. If, on the other hand, decoding is necessary or desired, content-specific decoding module 169 performs the appropriate decoding as illustrated by step 190. In this case, as a result of step 190, compressed content 123 is recovered and can be presented to the playback device in step 192.

In terms of the above-described example of a digital video clip encoded utilizing MPEG-2 and MPEG-4 encoding techniques (in steps 46 and 50 of FIG. 2, respectively), in this step 190, compressed content 170 is decoded utilizing MPEG-4 decoding to result in compressed content 123, which is still encoded with MPEG-2 encoding. This compressed content 122 can then be further decoded or presented to the recipient's playback device for decoding whereby appropriate decoding algorithms can be employed to recover the original content.

Alternatively, recipient may be in a situation where he or she does not have a playback device that is capable of decoding the content in accordance with the original encoding schemes. For instance, in the above-described example of the digital video clip, the recipient may not have a playback device that is capable of decoding and playing back MPEG-2 encoded video. In this situation, content-specific decoding module 169 can be configured to determine whether this second level of decoding is necessary and, if so, to perform this second level of decoding such that the content can be played back for the recipient. Furthermore, to conserve disk or memory space associated with the playback device, the recipient's application can also be configured to perform an alternative encoding technique utilizing to create a compressed file that can be accessed by his or her specific playback device.

Thus, the various components of the architecture described in FIG. 3 can be implemented in such a way as to be customized or customizable for the various users depending on the equipment and/or algorithms they may have at their disposal. For example, when configuring his or her system, a user can specify the type of electronic devices that he or she uses for the capture and playback of various types of content such that the appropriate encoding and decoding algorithms can be employed by the invention. Alternatively, a simplified approach can be taken wherein the content-specific decoding 169 is implemented to simply perform the mirror image of the content-specific encoding that was performed at the user's terminal.

The processes described above were presented utilizing simple examples such as that of a digital still image or a digital video clip as original media content 8 to be transferred across communication medium 20. As would be apparent to one of ordinary skill in the art after reading this description, the implementation of the various features and functionality of the invention is not limited to these specific examples, but instead can be applied to various forms of media content 8, especially where such media content 8 is suitable for compression. One further alternative example that has not been expressly discussed above is that of original media content 8 that includes multiple forms of content. Examples of this can include a movie that has both audio and video content. Another example can include a document file such as, for example, a PowerPoint® file that might include text, graphics, animation, and sounds. With these examples, simply applying one type of algorithm for first-level encoding and another algorithm for second-level encoding may not yield optimum results, as many encoding algorithms are optimized for a particular type of content. For example, it may not be beneficial to apply zip-type compression techniques to a PowerPoint® file, as such techniques do not typically yield good compression results for components of the file such as embedded graphics, animation, or audio components that may be included in the PowerPoint® presentation materials. Likewise, applying MPEG compression may yield good results for digital video clips; however, such compression would not effectively compress audio accompanying the digital video. As such, one aspect of the present invention can be included to identify the various components of the original media content 8, and apply appropriate content-specific encoding to one or more of those components to optimize or at least improve the compression applied to the one or more components, thereby improving compression of the combined content as a whole.

Figure 5:
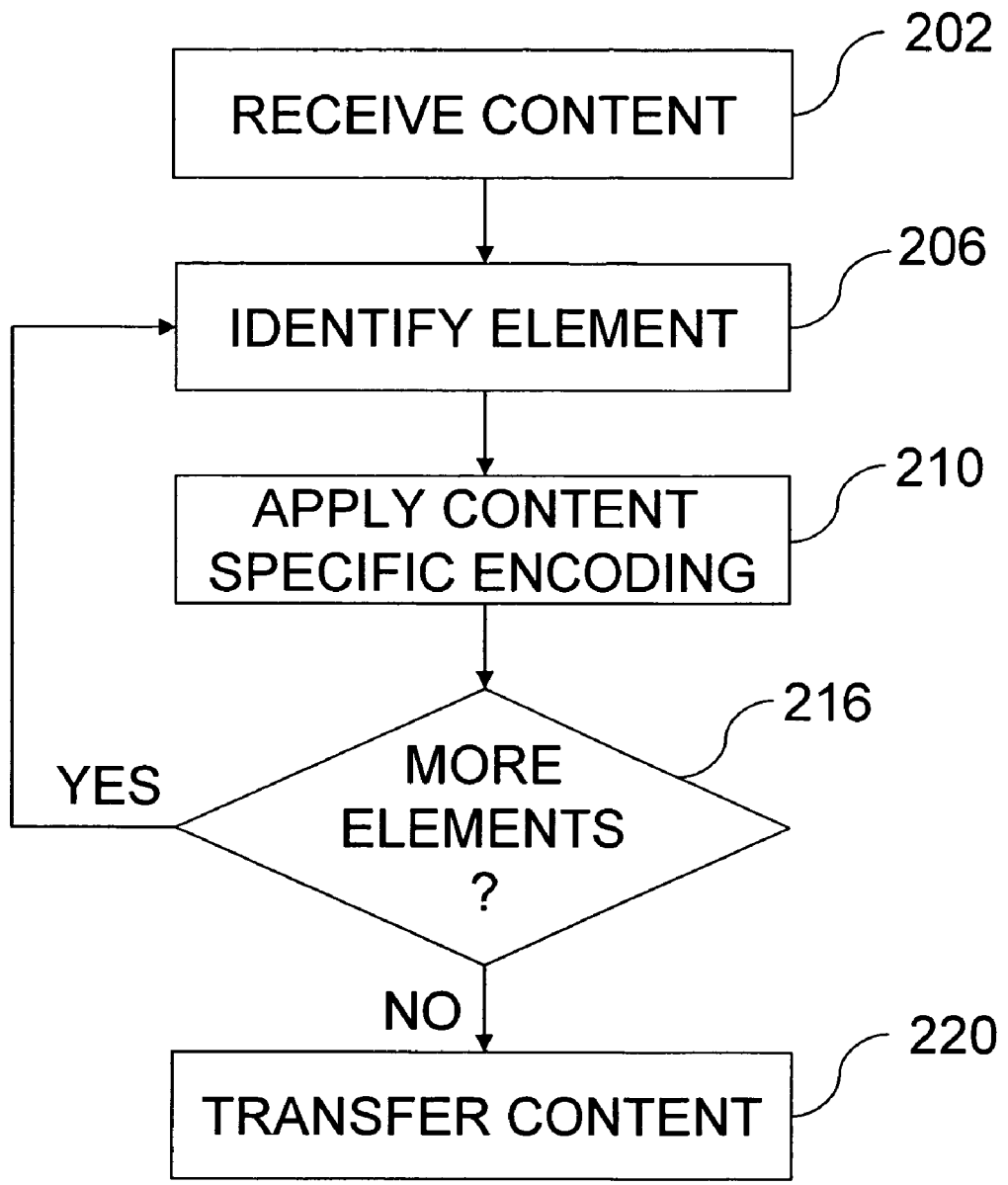
FIG. 5 is an operational flow diagram illustrating a process by which content-specific decoding can be performed on multiple components of content in accordance with one embodiment of the invention.

FIG. 5 is an operational flow diagram illustrating a process by which such content-specific decoding can be performed on multiple components of content 8 in accordance with one embodiment of the invention. To facilitate discussion of this feature, it is described in terms of an example implementation where original content is a presentation file having text, graphics, video, and audio components embedded therein (for example, a PowerPoint® file). After reading this description, it will become apparent to one of ordinary skill in the art how to implement this feature with other applications or other forms of media content 8 having the same or different various components.

Referring now to FIG. 5, in a step 202, content-specific encoding module 168 is invoked and receives or retrieves original media content 8. As discussed, original media content 8 is a presentation file having multiple components embedded therein. Thus, in a step 206, content-specific encoding module 168 identifies a first element of original media content 8. For example, with the exemplary presentation file, the first element identified may be a text portion of the presentation file. As such, in a step 210, content-specific encoding module 168 performs the appropriate encoding on the text components such that they are compressed in a desirable fashion. In a step 216, content-specific encoding module 168 determines whether there are more elements that are suitable for encoding. In the described example, there are additional elements, so, in this case, the process resumes at step 206, where the next element is identified. In this example, the next element may be a graphical image that is embedded in the PowerPoint file. For example, a photograph or other image (or multiple images) can be included on one or more pages of the presentation. Thus, in step 206, these components are identified and, in step 210, the appropriate content-specific encoding is performed on these components. For example, in the case of a digital image embedded in the presentation file, the appropriate encoding might by JPEG or wavelet encoding.

Once again, at step 216, the module determines whether there are additional elements and, if so, the elements are identified in step 206 and appropriately encoded in step 210 until each of the elements has been appropriately handled. Of course, it is desirable that each element that makes up the original media content 8 be appropriately coded using content-specific encoding. Thus, in the described example, any video clips included in the PowerPoint presentation can be encoded using, for example, MPEG-4 encoding and, similarly, audio clips can be encoded using MP3-type encoding. Once the desired components have been encoded using the content-specific encoding, in a step 220 the content can be transferred using transfer application 174.

The various elements identified may be identified, for example, by parsing through the presentation file to locate pieces of the document that can be encoded using content-specific encoding. The process described above can be done on a page-by-page basis for the presentation file, but other approaches may be more desirable depending on the file type.

In one embodiment of this process, one or more of the various components are extracted such that content-specific encoding can be performed thereon. These various components can be transferred, for example, as separate files and reconstituted at the recipient's end to reproduce the original form of the presentation file.

The parsing can be performed, for example, page by page and the elements on each page identified for further content-specific compression. If there are remaining parts of the file that are not suitable for compression using content-specific encoding, in one embodiment, these can be compressed using a fallback common compression scheme such as, for example, RAR, GZip, Zip, or other compression techniques.

One advantage that can be achieved with one or more implementations of the present invention is that users can take advantage of the latest compression techniques and codec algorithms regardless of whether an electronic content device they own is capable of handling such advanced standards. For example, a given user may own a digital camera and a digital camcorder that were purchased at the turn of the century, wherein the digital camera utilizes JPEG encoding and the digital camcorder utilizes MPEG-2 encoding. As a result of the invention, content-specific encoding module 168 can be implemented so as to provide enhanced encoding algorithms to the user such that his or her captured content can be further compressed using these latest techniques regardless of the content devices he or she may own or have access to.

As a result, in this example, the user can capture images with his or her existing equipment and utilize the present invention to perform second-level content-specific encoding to further compression the content such that it can be effectively transferred across communication medium 20. As new standards and codec algorithms evolve, content-specific encoding and decoding modules 168, 169 can be upgraded to accommodate these latest improvements. In one embodiment, this can be accomplished by a simple software upgrade that can be installed on computing device 4 or computing device 6 to enable the latest functionality. As such, users can take advantage of progressive compression and decompression techniques even while using previous-generation electronic capture and playback devices. Should interim encoding or compression steps be required, these can be implemented and performed as well.

According to yet another implementation of the invention, the system can be configured such that it can be backward compatible with various formats that users may have. For example, the recipient may be able to select the format utilized by his or her content playback device such that content-specific decoding module 169 can perform the appropriate type of content decoding so that compressed content 122 can be compatible with the recipient's playback device.

The invention can be implemented such that at least some of the encoding and decoding schemes can provide lossless, or at least perceptibly lossless, (depending on the content type) encoding and decoding to make better use of the available bandwidth for communication channel 20. In one implementation, options for various settings can be provided to the users such that the level of losslessness of the compression and decompression can be selected. Thus, for example, a user may decide to make a greater trade-off between reproduction quality and transferability.

In another embodiment, the application can be implemented to provide varying levels of service based on various factors such as, for example, user preferences, service levels subscribed to by various classes of users, bandwidth or other system constraints, and so on. For example, in one embodiment, the invention can be implemented to provide different levels of service to recipients sending and receiving digital photographs. In one example of this embodiment, the users can select from among these three categories of service based on image resolution. These can be: screen-resolution images—i.e., images that have sufficient resolution for screen display; print-resolution images—for example, limited to 5 Mega Pixels; and professional-resolution images—for example, unlimited in size. Such service level restrictions can be placed on either the recipient or the sending user. In situations where a receiving user and a sending user have differing levels of service, the server 22 can be used to resolve differences that may arise. For example, consider a sending user who has a level of service that allows print-resolution images is sending images to multiple recipients. Further consider a situation where one of those recipients has a level of service that only allows screen-resolution images. In this case, server 22 can be implemented to adjust the resolution of images sent to that recipient such that he or she receives the images with the resolution limited to the screen resolution as it may be defined for that level of service.

Varying service levels can also be provided by managing one or more other parameters in addition to or in place of image resolution (or content quality). For example, another methodology to allow implementation of varying service levels is to restrict system usage such as by way of limiting the amount of content that a user can send or receive. This can be limited, for example, by total size, quantity of content items sent or received, and other like factors.

In the example implementation illustrated in FIG. 1, communication of compressed media content 8 is provided by way of server 22. In one embodiment, the invention can be implemented using a conventional e-mail service wherein the compressed content is transmitted from the first user to the recipient via an e-mail delivery service. For example, in this embodiment, content-specific encoding module 168 can be invoked or triggered by the user's e-mail application. In this example, the user could launch his or her e-mail application, compose a message, and attach one or more content items 8 to the composed message. As discussed above, these one or more content items 8 may already have the first level of encoding applied to them, depending upon how they are created or previously modified. Following this example, when these content items 8 are attached to the e-mail message (or at least prior to the e-mail message being transmitted across communication medium 20), content-specific encoding module 168 is invoked and the content-specific encoding is applied to one or more of these content items 8 to create one or more compressed content items 170. With this second level of content-specific encoding, the e-mail message with its attachments can now be transferred via communication medium 20 to the recipient.

It is useful to note that with traditional e-mail delivery services, the e-mail message is typically delivered via an e-mail server. In a typical process, the e-mail service looks up the e-mail server to which the intended recipient is registered. The e-mail with its attachments is sent to that server and can be retrieved by the recipient when he or she accesses the server to download any received messages. As a result of content-specific encoding, the message and attachments may be smaller than they otherwise would have been, thus possibly falling within any size limitations imposed by the e-mail server or e-mail service. Alternatively, in another implementation, server 22 can be implemented as a special-purpose server (e.g., dedicated or including appropriate functionality of the invention as described herein). Using the functionality in this manner can allow the delivery of content to be managed without constraints placed by various e-mail service providers. Thus, for example, in this implementation a message that a user wishes to send having one or more content items attached thereto can be sent by the first user's computing device 4 to server 22 for subsequent delivery to the one or more recipients. Server 22 can be configured to allow acceptance and delivery of messages with one or more attachments having a size greater than that which may be accepted by some conventional e-mail services.

The functionality for accomplishing this can be implemented in a number of different ways. For example, in one embodiment, content-specific encoding module 168 and transfer application 164 can be linked to and invoked by the user's traditional e-mail application (or can be included as part of the e-mail application). For example, users may wish to send digital images of their children to the children's grandparents. In this example, the users can create an e-mail message using their conventional e-mail program (such as, for example, Microsoft Outlook®, Lotus Notes® or other suitable e-mail application), address the message, add text to the message, and add the digital pictures or other attachments. The e-mail program can be configured to recognize the attachments, for example by file type, and invoke content-specific encoding module 168 as a result of recognizing a particular file type that would benefit from content-specific encoding. This trigger can be configured to occur automatically upon recognition of such files or, alternatively, can be configured to trigger only after the attachments have reached a certain file size. Following this example, the e-mail application or transfer application 174 can then send the compressed content to a special purpose server (as opposed to the traditional e-mail server) for subsequent delivery to the users.

Alternatively, the functionality described herein can be implemented in an application that is independent of the user's e-mail application. For example, if a user wishes to send media content 8 to a recipient the user can start a content-sharing application to conduct the transfer. The content-sharing application can be configured to look similar to an e-mail program, allowing the user to provide an identification of the recipient, a message to be delivered to the recipient, and the content to be included with the delivery such as, for example, by way of attachment. Thus, in this example, the graphical user interfaces (GUIs) of the content sharing application can be implemented to provide a look and feel that is similar to an e-mail application.

In one embodiment, the content-sharing application can be implemented to allow the recipient's e-mail address to be used as the identification of that recipient. Thus, the user would not have to keep track of multiple identifications or addresses for the various recipients. Instead, the user can simply use a known e-mail address for the one or more recipients to which the user wishes to send a message with media content 8. Thus, in this embodiment, this implementation of the content-sharing application can allow the user to utilize his or her conventional e-mail address book to address delivery of media content 8 to one or more recipients. Thus, with this application, the user can compose and create the content delivery message with the desired media content 8 using content-specific encoding module 168 to create compressed content 170 and transfer application 174 to transfer the compressed content 170 via communication medium 20 to one or more recipients. Thus, the content sharing application can be implemented as an e-mail-like application, which can comprise a conventional e-mail application or an application that is not the user's email application but has a look and feel similar to an e-mail type of application (and may optionally invoke portions of the user's e-mail application such as the address book).

Figure 6:
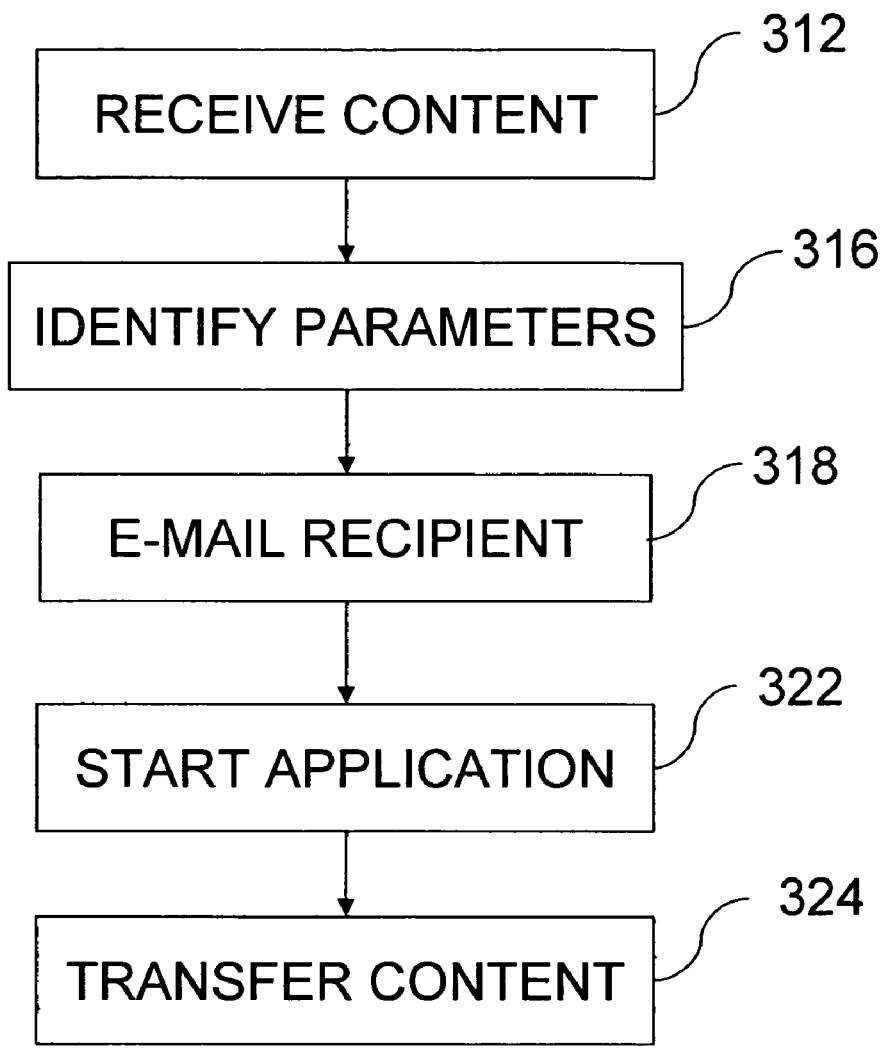
FIG. 6 is an operational flow diagram illustrating an example process by which a server can transfer compressed content to one or more recipients in accordance with one embodiment of the invention.
Figure 7:
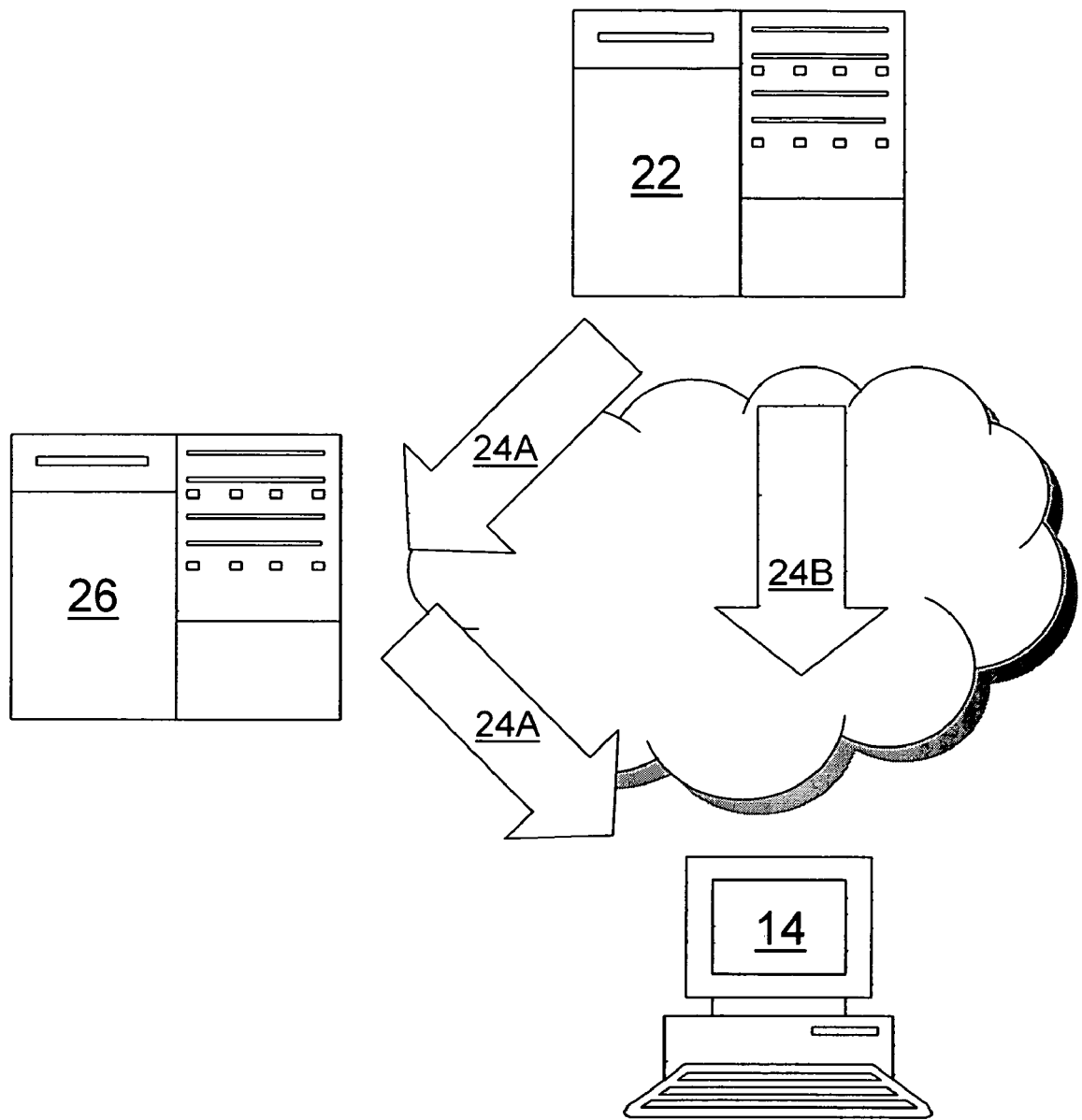
FIG. 7 is a block diagram illustrating an example architectural configuration accompanying FIG. 6 in accordance with one embodiment of the invention.

In embodiments using one or more servers 22 to effectuate the transfer, content transfer application 174 provides the created message to server 22. FIG. 6 is an operational flow diagram illustrating an example process by which server 22 can transfer compressed content 170 to one or more recipients in accordance with one embodiment of the invention. FIG. 7 is a block diagram illustrating an example architectural configuration accompanying FIG. 6 in accordance with one embodiment of the invention. Referring now to FIGS. 6 and 7, in a step 312, the content is received at server 22. In one embodiment, the content received in step 312 is compressed content 170, which can have both first- and second-level encoding applied to it.

In a step 316, server 22 identifies delivery parameters associated with the message. Delivery parameters can include, for example, an identification of the recipient (e.g., the recipient's e-mail address or other identifying information), an identification of the message content, an identification of any message attachments, and an identification of attachment types.

In a step 318, server 22 generates an e-mail message 24A to the one or more recipients identified in the original message. E-mail message 24A tells the recipients that they have content to be delivered from the sending user. The e-mail message 24A can include any part or all of the original message generated by the sending user, but preferably would not include the actual attachments themselves. The e-mail message can be sent via the recipient's designated e-mail server so that the recipient receives the notification as a conventional e-mail message in his or her inbox.

As discussed below, the attachments can be delivered independently of e-mail server 26 as illustrated by arrow 24B. However, e-mail message 24A can include some form of identification of the content being delivered to the recipients. For example, e-mail message 24A can include a list of the content pieces to be transferred (with or without details), thumbnails of the pieces, or other information that can indicate to the recipient the content being delivered.

E-mail message 24A can also be configured to include an icon, button, or other feature that can be used by the recipient to launch the recipient's transfer application 174 (or to install the application as discussed below). Thus, with the inclusion of this feature, the user can easily invoke transfer application 174 to begin transferring the compressed content 170. Alternatively, the user can otherwise launch transfer application 174 to facilitate the transfer of the content to the recipient.

Thus, as illustrated in a step 322, transfer application 174 at recipient's computing device 6 is invoked and in a step 324 the content is transferred. In one embodiment, transfer application 174 can go to server 22 and pull the content requested. This can be implemented so as to retrieve all of the content designated for that particular recipient. Alternatively, it can be implemented so as to retrieve only part of the content designated for the recipient by sending user. For example, the recipient may browse thumbnails or other included information and select one or more pieces of the available content for delivery; thus, transfer application 174 can be implemented to retrieve the selected subset of content items, rather than all of the content items.

An additional feature that can be provided is to allow the recipient to schedule the delivery time for the selected content. For example, the recipient may prefer to not tie up its computing resources with the delivery of the specified content at such time as the recipient accepts delivery. In this embodiment, the recipient can be provided with the ability to schedule a delivery date and time when it would be more convenient for transfer application 174 to retrieve content 24B from server 22. For example, the recipient may wish to schedule the actual delivery to occur overnight when the recipient is not otherwise using computing device 6 and any associated communication links.

When transfer application 174 pulls the information from server 22, a new message 24B can be created delivering the content to the user. New message 24B with the included content can be configured to appear in the user's in box in his or her conventional e-mail application or, alternatively, can be configured to appear in the content-sharing application separate from (but perhaps related to) the user's e-mail application, or both.

In the embodiments illustrated in FIGS. 6 and 7, server 22 is configured to send an e-mail message 24A to the one or more designated recipients and, via separate messaging 24B, transfer the content to the recipient. As yet another alternative, server 22 may be configured to dynamically create one or more web pages on which the desired content is stored. In this alternative, a URL or other link to the configured pages can be included in e-mail message 24A indicating to the recipient where the content can be found. In this embodiment, the recipient can click the link, thereby launching or redirecting his or her browser to visit that page. Once on that page, the user can select which, if any, of the content items he or she wishes to download.

These web pages can be configured such that they are password protected or use other safety measures. For example, a sending user may separately provide a password to one or more recipients allowing them to access the established web pages, but only with the use of those passwords. Thus, server 22 can create the web page with the appropriate password protection, preventing unauthorized users from accessing the content contained thereon. Of course, different levels of password protection can be provided to different recipients such that only certain designated content items are available to certain of the recipients based on the password provided. In one example implementation, the web page includes, for example, thumbnail images of the actual digital photographs such that the recipient can scan and select for downloading. The download can be accomplished via web (e.g., from the above page itself), via a message 24B from server 22, or alternatively via e-mail message 24A.

In yet another embodiment, a URL or other link, can be used as a mechanism to trigger delivery of content to one or more users. In this embodiment, rather than linking to the content pages as set forth above, the URL can be used to trigger the application to go to server 22 and retrieve the associated content. For example, a user may be browsing a website and encounter a link created in this manner. Clicking the link would trigger the browsing user's content sharing application, causing it to go to server 22 and request the associated content via the one or more delivery mechanisms described herein. This allows the sending user to include this link, for example, on his or her website, or to e-mail the link to one or more recipients. In one embodiment, two links can be provided, one for the user to select if he or she already has the content sharing application, another to select if he or she does not. In cases where the recipient does not have the application installed, installation can take place, for example, as discussed below with reference to FIGS. 8 and 9. In one embodiment, the recipient may be prompted to enter an e-mail address (or other information) so that an account can be created in conjunction with application installation as discussed below.

In one embodiment, users of the system can be set up with accounts in the system. Having an account can simply mean the user has the content sharing application running on his or her computing device (and perhaps also an identification to facilitate transmittal of messages). Alternatively, accounts can include additional information such as user name and password, preferences, payment information (for paid subscription services, if any) and so on. However, in embodiments using accounts, it is desirable to allow a user to send a message to a recipient without having to determine whether that recipient has an existing account.

Figure 8:
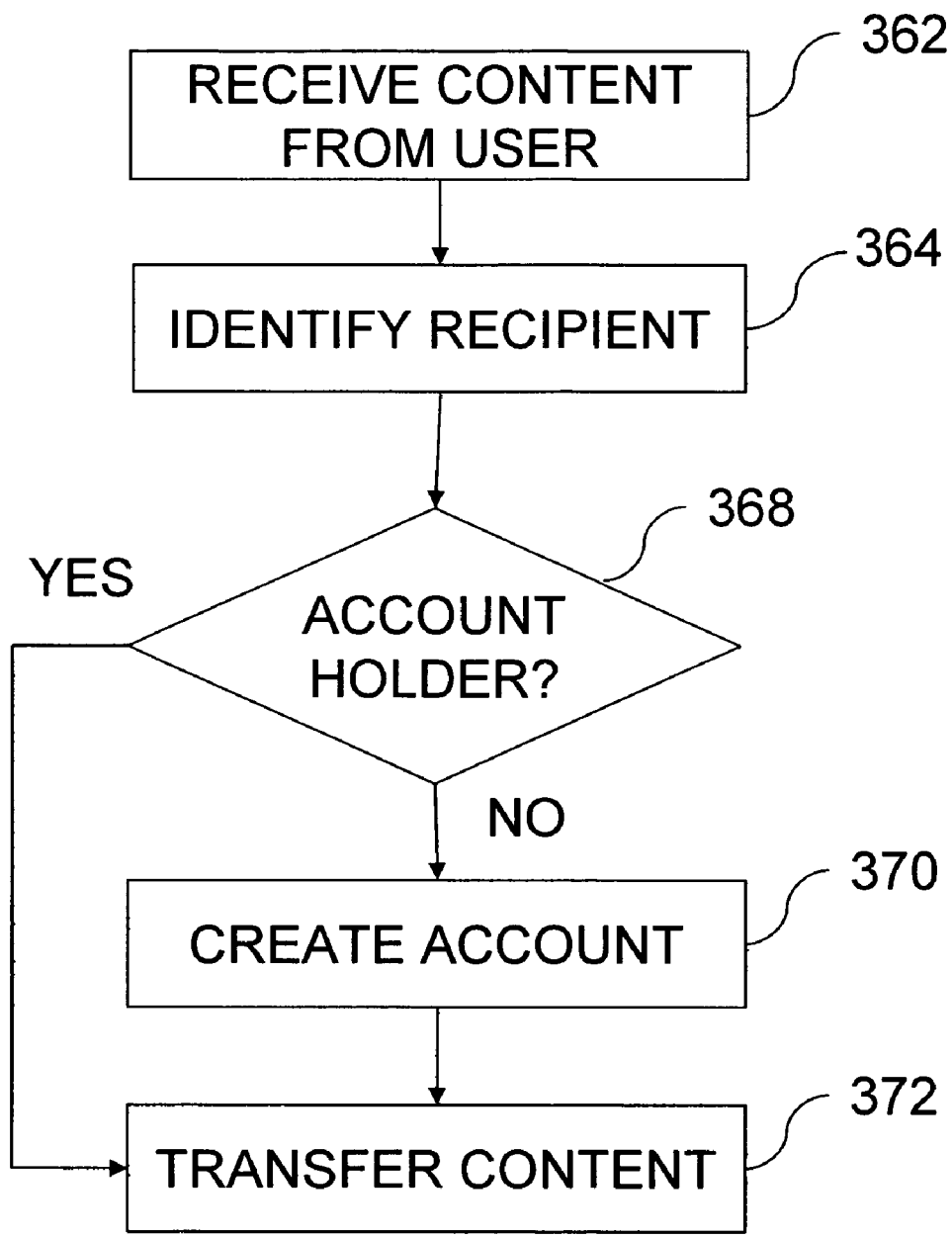
FIG. 8 is an operational flow diagram illustrating an example process for configuring a new account in accordance with one embodiment of the invention.

As such, in one embodiment, the invention can also be implemented to automatically create accounts for one or more recipients who may not be account holders. FIG. 8 is an operational flow diagram illustrating an example process for configuring a new account in accordance with one embodiment of the invention. Referring now to FIG. 8, in a step 362, server 22 receives content from user for transfer to one or more recipients. In a step 364, server 22 identifies the recipient, for example, using the recipient's e-mail address or other identifying information provided by the sending user.

In a step 368, server 22 checks to determine whether the identified recipient is an account holder for the content-sharing invention. For example, in this step 368, server 22 can check the recipient's designated e-mail address to see if an account already exists under that e-mail address. If an account does exist, in a step 372, server 22 can transfer the content to the account-holding recipient, as that recipient is already a registered user. This content transfer can take place, for example, as discussed above with reference to FIGS. 6 and 7.

If, on the other hand, server 22 determines that the recipient is not an account holder, server 22 can take steps to create an account for the recipient as illustrated in a step 370. The creation of such an account in step 370 is discussed in detail below with reference to FIG. 9. Once the account is created, server 22 can then transfer content to the recipient in step 372, for example, as discussed above with reference to FIGS. 6 and 7.

While it is not necessary that the invention be implemented to require users to maintain accounts, using an account-based model can be useful to track user preferences, allow subscription-based services, and provide other features and controls that are typically available when account-based systems are utilized. One other feature of an account-based system is that it can track whether a user has any of the modules or applications useful for content sharing and, if so, which versions the user has. Thus, in one embodiment, the creation of an account (e.g., as illustrated in step 370) can also include the steps of providing the appropriate applications to the user for which the account is being created.

Figure 9:
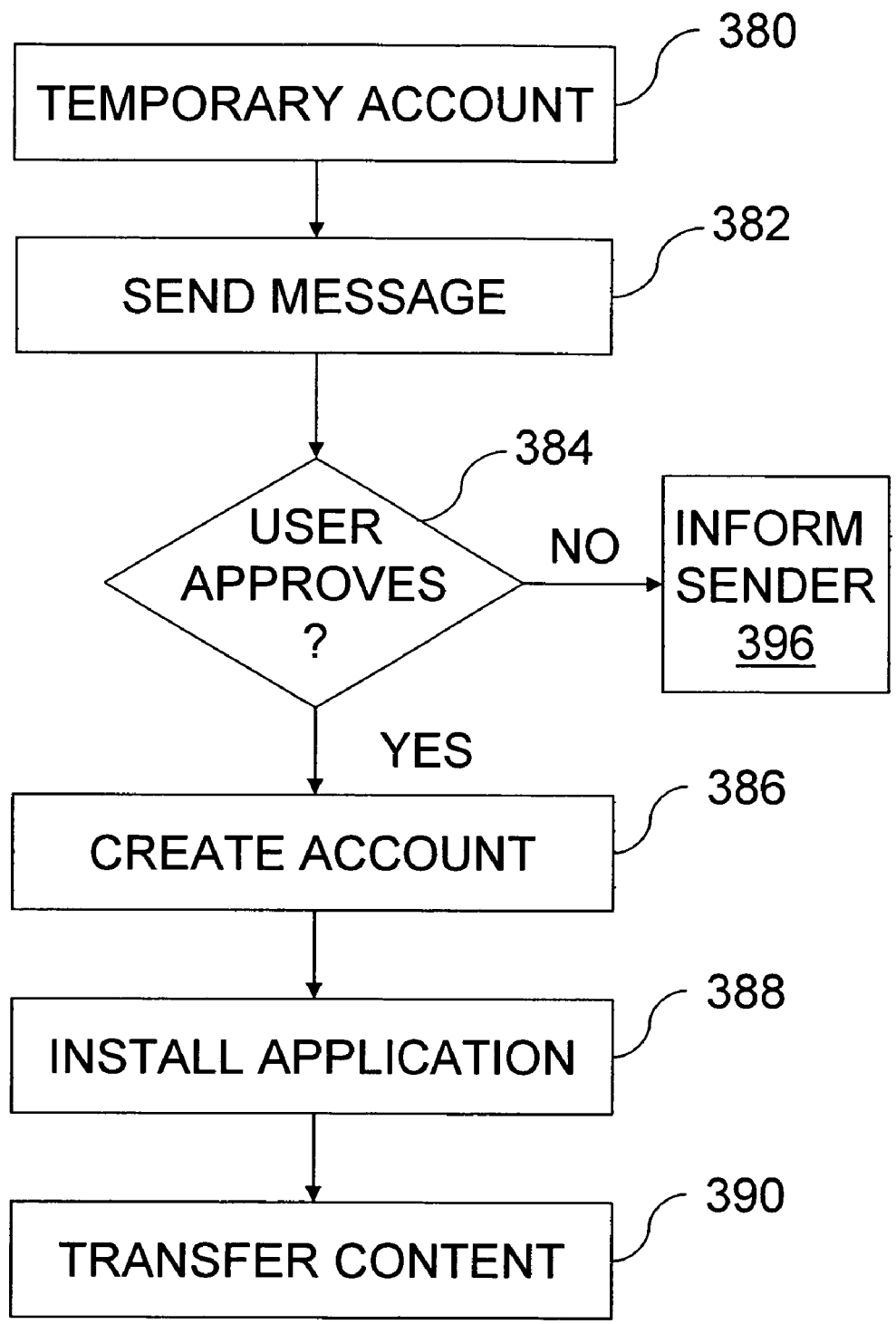
FIG. 9 is an operational flow diagram illustrating an example process of creating an account and installing the appropriate applications in accordance with one embodiment of the invention.

FIG. 9 is an operational flow diagram illustrating an example process of creating an account and installing the appropriate applications in accordance with one embodiment of the invention. Of course, automatic account creation is not the only way in which accounts can be created. One or more users can themselves initiate the set up of an account such as, for example, by accessing an appropriate web site and downloading the necessary applications. Referring now to FIG. 9, if server 22 determines that the recipient is not an account holder, in a step 380, server 22 creates, in this embodiment, a temporary account for that recipient. The temporary account can be utilized as a placeholder for the message generated by the sending user directed toward that recipient, and any content associated with that message. Thus, in step 380, server 22 may save the message and its associated content for later delivery to the intended recipient.

In a step 382, server 22 sends a message to the intended recipient indicating that recipient has a message from a sending user with associated content. For example, in one embodiment, this message is sent as an e-mail message to the recipient using the e-mail address provided by the sending user in his or her transmittal. This e-mail message can indicate that the sending user has content and other information that he or she would like to send to the recipient and it can ask for the recipient approval to receive the content. The message can include any of a number of items included in or derived from the original message such as, for example, textual content included by the sending user in the original message, thumbnails or other indicia of the media content 8 included with the original message, and other information that may be useful to the recipient in determining whether to approve delivery of the content.

In a step 384, the user is queried via the e-mail message whether he or she wishes to establish an account. For example, an icon or other button can be presented such that the user can click the icon to approve the creation of an account and the installation of an application. Thus, following this one-step process, the user can approve the delivery, install any necessary or useful applications, and receive the content associated with the original message. Therefore, if the user approves in a step 386, server 22 creates an account for the recipient.

In one embodiment, the automatic install feature can be implemented having two or more install buttons or icons such that the user can select the appropriate operating system on which the application will be installed. For example, the user may be provided with multiple install buttons to select among various Windows® or Macintosh® operating systems. Alternatively, the version choice can be performed automatically by checking system parameters of the recipient's computing device 6.

In one embodiment, this account can be created with nothing more than the recipient's e-mail address or other identifying information such that content can be delivered to the appropriate destination when that user is identified as the recipient. In alternative embodiments, additional information can be used in the creation of the account and can be collected, for example, from the sending user or the recipient him- or herself.

In a step 388, any necessary or useful applications are installed on recipient computing device 6 such that the recipient can effectuate transfer of the content. For example, in one embodiment, the transfer application 174 and content-specific decoding 169 are installed on recipient's computing device 6 such that recipient can transfer content to his or her computing device and perform any decoding that may be necessary. Additionally, one or more content-specific encoding modules can be installed at this time (for example, content-specific encoding module 168) to allow the recipient to also generate compressed content for transmission to further recipients.

Once the appropriate applications are installed, in a step 390, the content is transferred to the recipient. In one embodiment, this can be accomplished as discussed above with reference to FIGS. 6 and 7. In one embodiment, prior to transferring content in step 390, the system requests recipient to confirm his or her ID as a safety measure. For example, server 22 can send a message to the designated e-mail address of the recipient asking that recipient to confirm that he or she configured the account and wishes to receive the content.

If, on the other hand, the recipient indicates that he or she does not want to receive the content or install the appropriate or useful applications, a message can be sent to the sending user informing that user that the designated recipient will not receive the content.

In one implementation, server 22 can be implemented as a content-aware server such that it can perform one or more desired or specified functions, depending on the content type or depending on other parameters associated with the requested transfer. For example, in a scenario where a user wishes to transfer a large number of digital still images, server 22 can receive the transfer request, including the images, and generate and send thumbnails of the images to the one or more designated recipients. In this example, the one or more recipients can view the thumbnails and determine whether they would like to receive any or all of the compressed images represented by the thumbnails.

As another example, server 22 can receive a digital video file from a user for transfer to one or more users. Server 22 can be implemented to identify the video file as being a video file and can be further implemented to identify types of compression applied to the video file. Server 22 can be implemented to deliver the video file to the one or more designated recipients as is or to perform further modifications prior to delivery. For example, server 22 can be configured so as provide the digital video content as a streaming video for delivery to the one or more intended recipients. As another example, it can be implemented to segment the digital video into pieces and deliver the video in a piece-by-piece fashion to the recipient rather than via a bulk transfer of the entire video. Server 22 in this example can also be implemented to convert the format of the content, for example, converting the received digital video item into a QuickTime® file format or other proprietary format, prior to transfer to a recipient.

Of course, these examples only serve to illustrate the numerous possibilities that are available when implementing a server 22 as a content-aware server that can identify and operate on one or more particular types or formats of content. In one embodiment, server 22 can be configured to operate on one or more particular content items in accordance with a predetermined or ad hoc plan. Alternatively, the content-aware functionality can be configured and reconfigured by one or more users (sending users or recipient users) based on preferences they may have. For example, a sending user may wish to send a large number of digital images to a recipient with the understanding that the recipient can pick and choose from among those images to determine which images the recipient actually wishes to download. In this example, the sending user may be provided with the option at the time of composition of the message to select the type of delivery desired. In this instance, the sending user may opt to select an option to generate and send only thumbnails to the recipient such that the recipient can select which of those images he or she wishes to ultimately receive. In the implementation discussed herein using a content-aware server, it is contemplated that the thumbnails would be generated and sent by server 22. Alternatively, to conserve bandwidth between the sending user and server 22, the thumbnails could be generated and sent at the sending user's computing device 4 prior to transmission to server 22.

As yet another example, a receiving user may be accustomed to the fact that he or she typically receives messages from a sending user that usually contain a large number of images. In this example, the receiving user may also be operating under bandwidth constraints wherein delivery of content of this magnitude is difficult or impractical for that receiving user. In this example, the receiving user can be provided with the option to configure his or her account to indicate that thumbnails be sent prior to the delivery of the actual content such that the recipient can designate which of the multiple images he or she wishes to actually receive. Likewise, for the example of a digital video content, a user may wish to designate that such content be delivered as is or as streaming media, for example, or in a particular format suitable for a particular player (e.g., QuickTime®, Windows Media Player®, or any of a number of media players).

Of course, the possibilities for designating custom delivery associated with various media types are not limited to the examples described herein of digital still images or digital video content, but, as would be apparent to one of ordinary skill in the art after reading this description, can be extended to a multitude of other scenarios where it would be useful or desirable for one or more users to establish parameters and other preferences for their accounts.

It is noted that a content-aware server can be implemented to provide one or more multiple advantages, such as, for example, decreasing the load required of the client devices, delivering thumbnails and allowing the recipient to select which of those to receive to conserve bandwidth and computing resources at the recipient's device. Additionally, in the described example of delivering digital video content, converting digital video content into another format at server 22 decreases the load on the client, as this conversion does not have to be done on the recipient's computing device 6.

As an additional alternative, efficiencies may be gained in the area of software licensing. For example, many licenses are set up such that it is cheaper or more efficient to perform certain functions for multiple clients on one or more servers than it would be to perform those functions at each of the various clients. Thus, for example, it may be possible to obtain certain licenses wherein only a single license is required to perform a format conversion or other operation on a single server prior to delivery of that converted content to the various recipients.

As described above, in one embodiment, the present invention can be implemented with one or more GUIs to give the invention a desired look and feel. In one embodiment, GUIs are implemented such that they allow the invention to resemble, at least to some extent, the look and feel of conventional e-mail applications with which one or more users may be familiar. Although any of a number of different looks and feels for the various GUIs is possible, an example implementation in which the look and feel is somewhat similar to an e-mail type of application is now described with reference to FIGS. 10-14.

The GUIs described in FIGS. 10-14 are described in terms of a content-sharing application that is configured to share photos (e.g., digital still images) as the content 8 being shared between a user and one or more recipients. These GUIs are illustrated and described in terms of this one example implementation for ease of discussion and to aid in understanding the invention. However, it will become apparent to one of ordinary skill in the art after reading this discussion how the GUIs can be implemented to allow the users to share additional or alternate types of content via the content-sharing application. Also, In the example GUIs illustrated in FIGS. 10-14, the content-sharing application is identified by the brand name "PhotoLeap"; however, alternative designations or names can be utilized without deviating from the spirit or scope of the invention.

Figure 10:
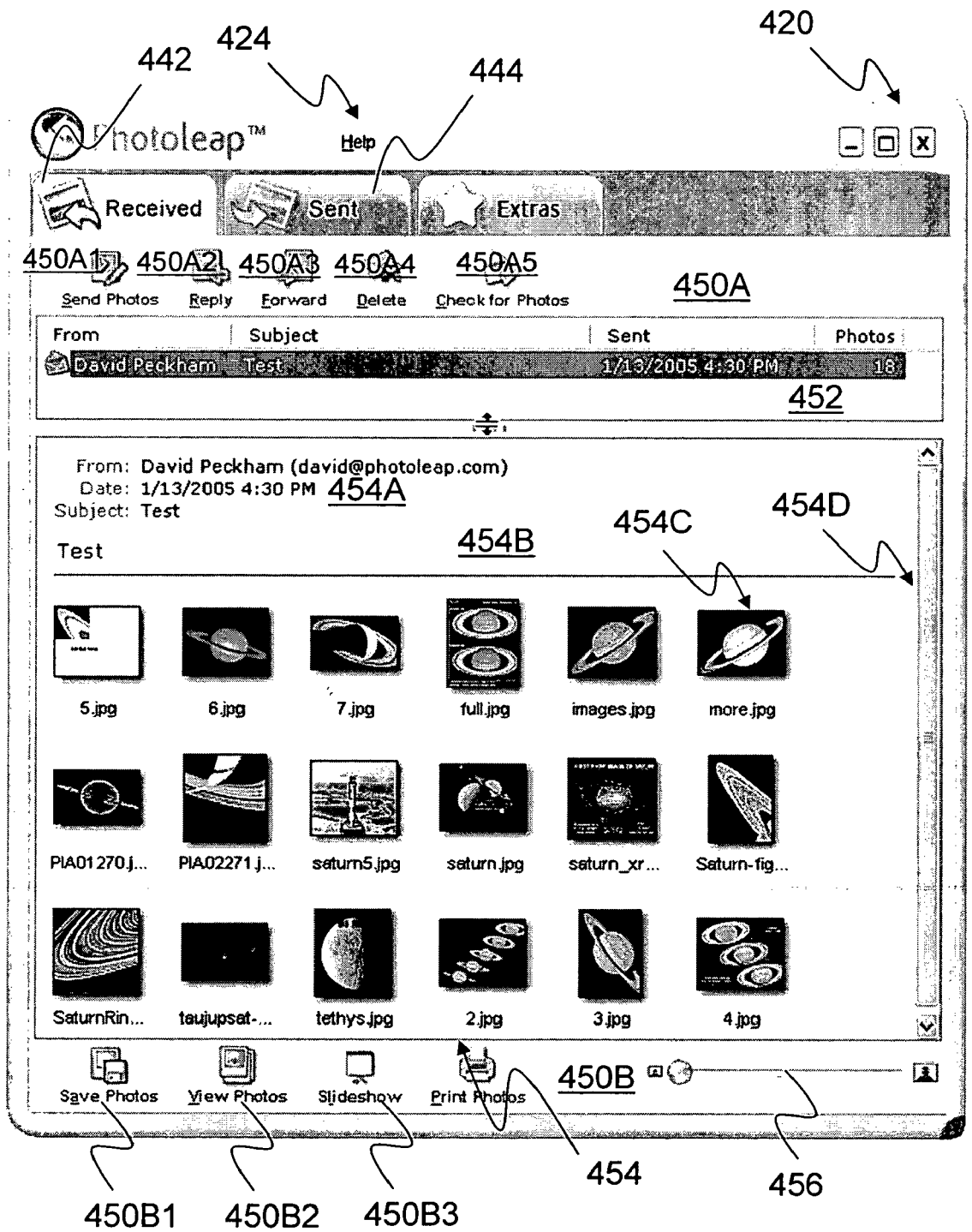
FIG. 10 is an example implementation of a GUI used to display to a recipient messages that he or she has received in accordance with one embodiment of the invention.

FIG. 10 is one example implementation of a GUI used to display to a recipient messages that he or she has received in accordance with one embodiment of the invention. In other words, FIG. 10 provides an example implementation of an 'in-box' GUI for a content sharing application. Referring now to FIG. 10, the example GUI includes conventional window sizing buttons 420 that can be used to maximize or minimize the current window, as well as to close the current application (or at least this dialog box of the application). Additionally, one or more sizing handles 422 can be included to allow the user to click and drag the open window to a desired size. A help selection 424 can also be included to allow the user to access various help files associated with the application.

The example GUI also includes two tabs: a receive tab 442, a sent tab 444 and an extras tab 446. Receive tab 444 can be used to display a view of received items, whereas sent tab 444 can be used to display a view of sent items. Extras tab 446 can be included to provide a view to delivery of advertising or subscription based content.

The example dialog box illustrated in FIG. 10 displays the GUI accessed by a received tab 442. The example illustrated in FIG. 10 includes two tool bars 450A and 450B, an in-box area 452, a message display area 454, and a zoom tool 456. In-box area 452 allows the application to display one or more messages received from a sending party by the recipient. In the example illustrated in FIG. 10, in-box area 452 includes a "From" field that displays the name or other identification of the sending party, a subject of the message, a date and time the message was sent, and an identification of any attachments associated with the message. In the example illustrated in FIG. 10, this identification of attachments illustrates that the attachments in the various messages in in-box area 452 are photos and further indicates the number of photos attached to each message. As would be apparent to one of ordinary skill in the art after reading the above description, the content-sharing application is not limited to sharing photos, but can share multiple types of content. As such, in-box area 452 can be modified to include multiple columns for various different content types, or other designation of the content type associated with a particular message.

Message display area 454 can be configured to show the user in a preview-pane format, the contents of a highlighted message. Alternatively, a message can be opened such that the content is displayed in an open-message format rather than in the preview pane. In the example illustrated in FIG. 10, message display area 454 also includes an identification of the recipient of the message 454A, any text or other information that may have been included in the original message 454B, and the one or more attachments associated with the message in area 454C.

In the example illustrated in FIG. 10, the one or more attachments shown in area 454C are thumbnail images of digital images that were sent with the original message to the recipient. Other implementations can be utilized wherein the attachments are identified as a list, list with details (e.g., file type, creation date, modified date, etc) or other format.

One or more scroll bars can be included (one is illustrated as being associated with message display area 454 and labeled as reference number 454D) on the various panes to allow a user to view selected content that consumes more area than the present pane size. Scroll bars such as scroll bar 454D can be utilized to scroll through the content provided in one or more viewing areas.

As discussed above, the example illustrated in FIG. 10 includes two toolbars, toolbar 450A and toolbar 450B. Toolbar 450A in the illustrated embodiment includes four buttons: an send photos button 450A1, a reply button 450A2, a forward button 450A3, a delete button 450A4, and a check for photos button 450A5. These buttons included with toolbar 450A in the example GUI can be used to invoke functionality similar to that which a user may be familiar with from using his or her conventional e-mail application. For example, send photos button 450A1 (or, more generically, e-mail content button) can be included to allow a user to compose a new message to send one or more photographs to a designated recipient. Likewise, check for photos button 450A5 can allow a user to check to determine whether there are any incoming messages with photos. In one embodiment, this can be done by checking an incoming message queue (for example, an inbox or the like) to see whether the recipient has received any incoming messages with attached content. In an alternative embodiment, this can trigger the application to query the server as to whether there is any content at the server that is designated for delivery to the recipient.

Similarly, reply button 450A2 forward button 450A3 can be used to allow the user to reply to messages or forward a received message on to another recipient. Additionally, delete button 450A4 can be included to allow a user to delete one or more messages in his or her in-box.

The example toolbar 450B illustrated in FIG. 10 includes a save as button 450B1, a view button 450B2, and a slide show button 450B3. Save as button 450B1 can allow the recipient to save one or more content items in the in-box, for example, as files in his or her directory structure. Button 450B2 can be included to allow the user to view one or more thumbnails selected in message display area 454. Likewise, slide show button 450B3 can be included to allow the user to view the images associated with one or more thumbnails in message display area 454 as a slide show.

Also included in the embodiment illustrated in FIG. 10 is a zoom tool 456. Zoom tool can be selected and used to enlarge thumbnails by clicking and dragging zoom tool 456.

Save as button 450B1 in one embodiment causes a browse for folder dialog to appear. This enables the user to select the location where he or she would like to save selected images. The browse for folder dialog can also include provisions to enable the user to make new folders and an OK button to approve saving of selected files into the selected folder.

Selection of view button 450B2 allows the user to view the photos in the message using a photo viewer included with the content-sharing application or a selected photo viewer of the user's choosing.

Figure 11:
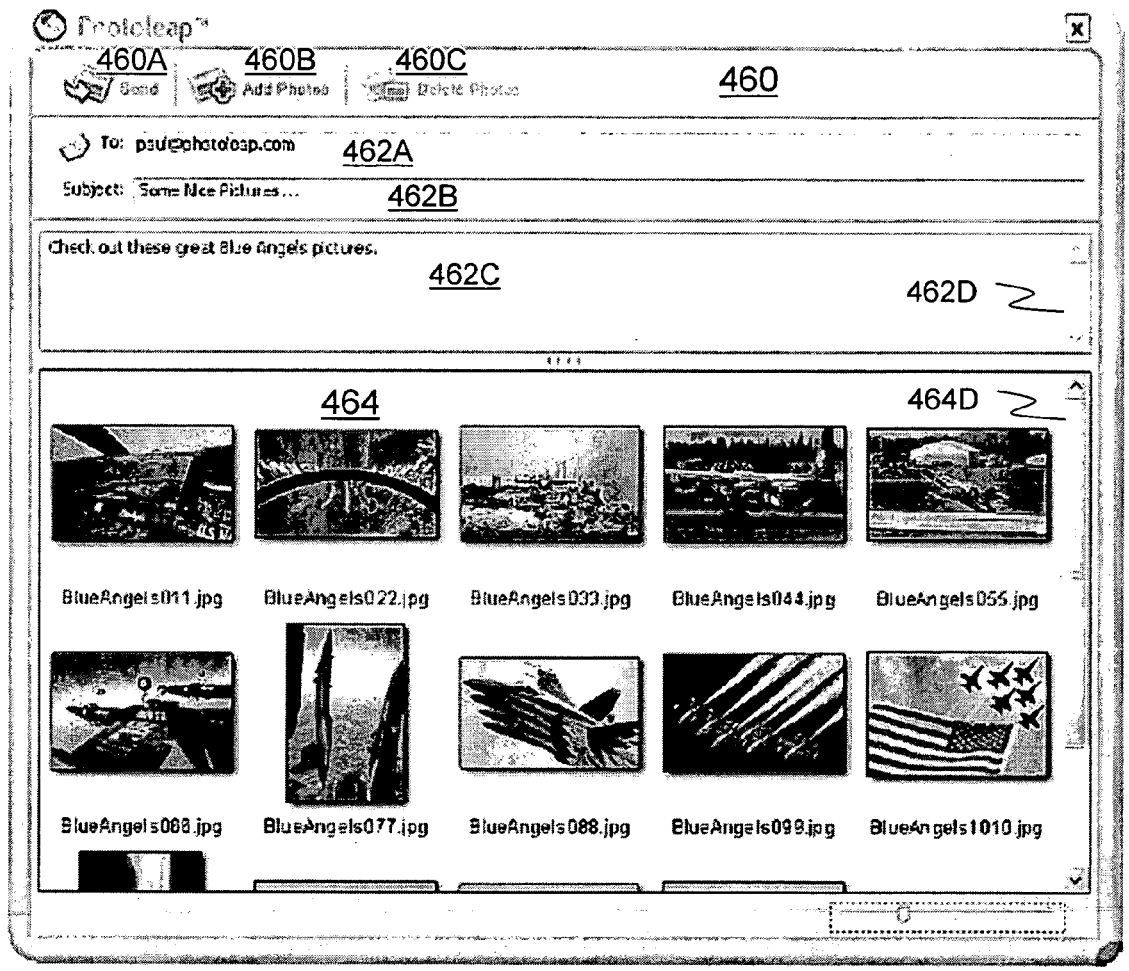
FIG. 11 is a diagram illustrating an example GUI invoked when the user clicks a send-photos button in accordance with one embodiment of the invention.

As discussed above, the embodiment illustrated in FIG. 10 includes an send photos button 450A1 that is similar to a compose button in a convention e-mail application. FIG. 11 is a diagram illustrating an example GUI invoked when the user selects send photos button 450A1 in accordance with one embodiment of the invention. Referring now to FIG. 11, this example GUI includes a toolbar 460, a message composition area 462, and an attachment area 464. In the example illustrated in FIG. 11, toolbar 460 includes a send button 460A, an add photos button 460B, and a delete photos button 460C. Send button 460A can be pressed by the user to send the message composed to the identified recipient or recipients in the to, cc, or bcc fields that may be included in message composition area 462.

Add photos button 460B can be selected to allow the user to add one or more content items as attachments (the example implementation is for photographs). Selecting add photos button 460B allows the user to add one or more images to the message being composed. As photos (or other content) are added to the message, they appear in attachment area 464. These can be displayed as thumbnails, by a list (with or without details) or with other identifying information so that the user can keep track of the photos or other content that he or she has added to the message. In the example illustrated in FIG. 11, the attachments are illustrated as thumbnails representative of the images to be sent to the designated one or more recipients. If a user selects one or more photos in attachment area 464, the delete photos button 460C will be active, and the user can click delete photos button 460C to remove these selected images as attachments to the message.

Message composition area 462 is included in this example to allow the user to compose an accompanying message to one or more recipients. For example, the sending user may want to include a text message to the recipient informing the recipient regarding the accompanying content.

The example illustrated in FIG. 11 includes a to field 462A for designating one or more recipients. In the example illustrated in FIG. 11, the recipient is designated by an e-mail address. Although not illustrated, message composition area 462 can also include cc and bcc fields similar to those found in conventional e-mail applications. Also illustrated in the example of FIG. 11 is a subject field 462B. Subject field 462B allows the user to provide a subject for the message. Likewise, message composition area 462 can also include a message field 462C wherein a user can compose a text message to the recipient. A scroll bar 462D can be included to allow the user to scroll through a message that may be longer than the size of area provided by message composition field 462C. Likewise, a scroll bar 464D can be provided to allow the user to scroll through the attachments contained in attachment area 464.

Browse, click and drag, or other functionality can be employed to add photos or other content to a message being composed using a GUI illustrated in FIG. 11. For example, a user may browse for photos or other content such as, for example, in Windows Explorer and click and drag files from the various folders accessed by Windows Explorer® into attachment area 464. Add photos button 460B, in one embodiment can invoke a dialog box allowing the user to browse for and select images or other content on the user's hard drive (or otherwise accessible to the user's computer system), allowing the user to select and add images or other content so selected. In another embodiment, Add photos button 460B can open a preview window such as, for example, Windows Explorer® allowing the user to select, click and drag images into the attachment area of the message.

Figure 12:
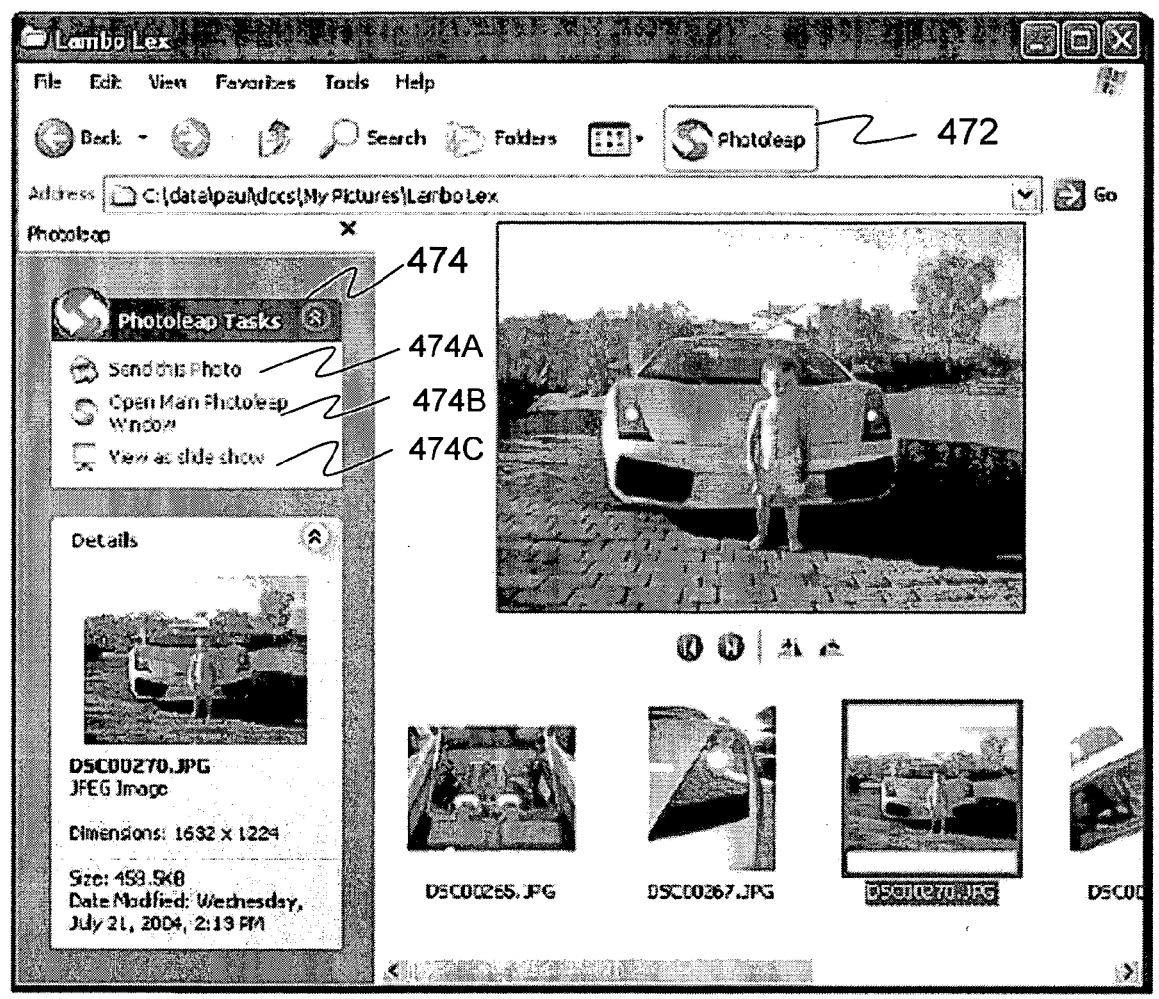
FIG. 12 is a diagram illustrating the selection of content (in this example illustration, digital images) for transmission to a recipient.

In some embodiments, the user is not required to compose a message by first going to a composition window such as that illustrated in FIG. 11. For example, in one alternative embodiment, the user can send photos directly from a file management application such as, for example, Windows Explorer®. FIG. 12 is a diagram illustrating the selection of content (in this example illustration, digital images) for transmission to a recipient. Referring now to FIG. 12, the user can utilize a file management application to browse for images he or she would like to forward to one or more designated recipients. A button 472 is provided to allow the user to invoke the content-sharing application. Clicking the content share application button 472 causes additional task options to appear in the sidebar 474. In the example illustrated in FIG. 12, these task options include selections to send this photo 474A, open the main application window 474B, and view the content as a slide show 474C. If multiple images are selected by the user, the send this photo button 474A appears as send the selected photos. If send this photo (or send the selected photos) 474A is clicked, the send photos dialog appears such as the one illustrated in FIG. 11, in which case the user can type the information into the to field and optionally include a subject and other message in message composition area 462 to accompany the transmission.

Figure 13:
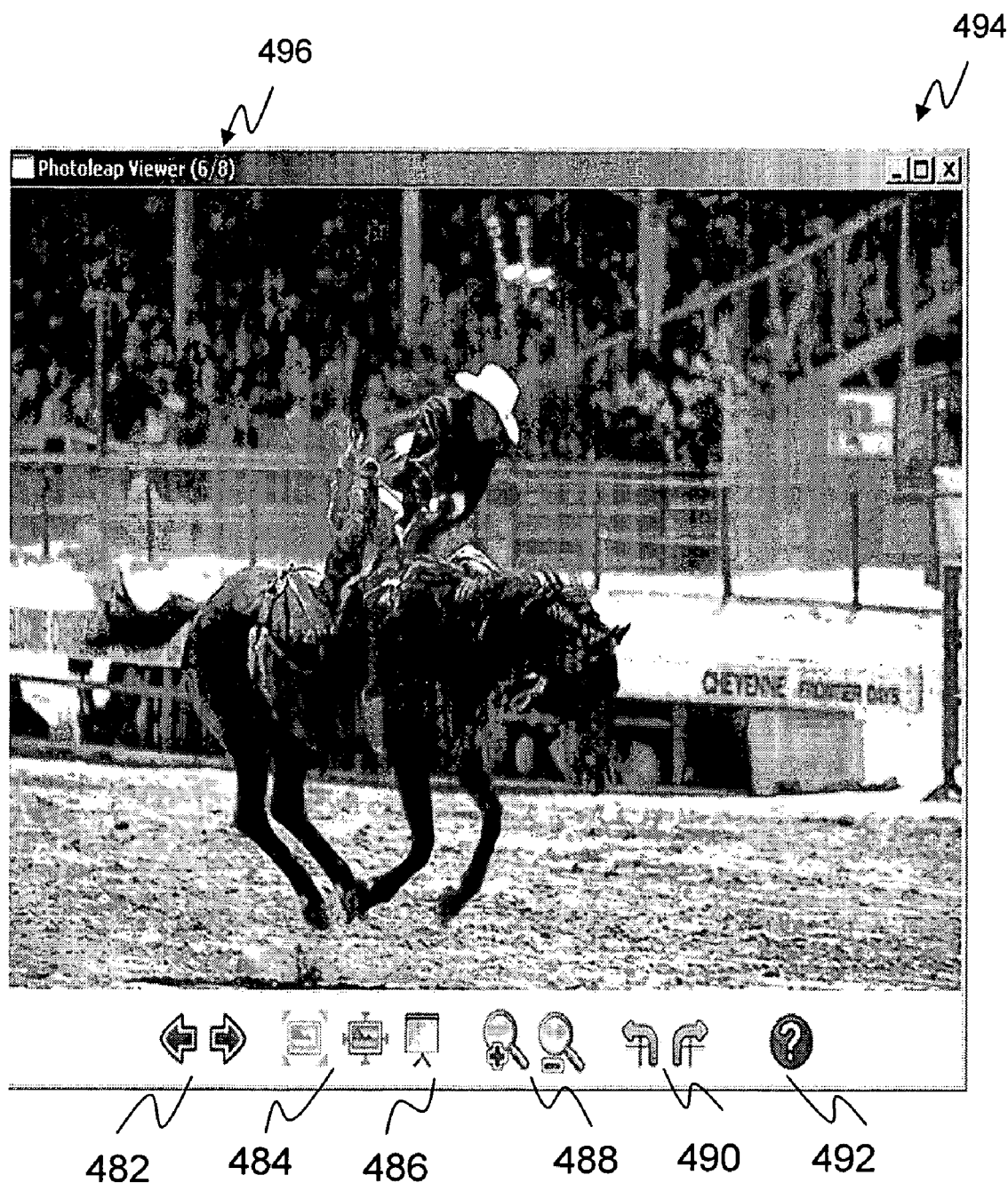
FIG. 13 is an example implementation of a viewer that can be included with content-sharing application in accordance with one embodiment of the invention.

FIG. 13 is an example implementation of a viewer that can be included with content-sharing application in accordance with one embodiment of the invention. Referring now to FIG. 13, when view content button 450B2 (FIG. 10) is selected, a view content dialog such as, for example, that illustrated in FIG. 13 appears. In the example dialog illustrated in FIG. 13, previous and next buttons 482 are included to allow the user to move forward and backward through the photos included in the viewing. Best fit and actual size buttons 484 can be included to allow the user to adjust the image view as desirable. Additionally, sizing handles can be included on the image to allow the user to manually adjust the size of the images being viewed. A slide show button 486 can also be included to allow the user to view the images in a slide show format. Zoom in and zoom out buttons 488 can be included to allow the user to enlarge the images or zoom out of the image. Rotate left and rotate right buttons 490 can be included to allow the user to rotate the selected image. Additionally, illustrated in FIG. 13 is a help button 492 to allow the user to access local or online help. Also illustrated in the example of FIG. 13 are sizing buttons 494 and image indicator buttons 496 that display the image number being viewed along with the total images included.

Figure 14:
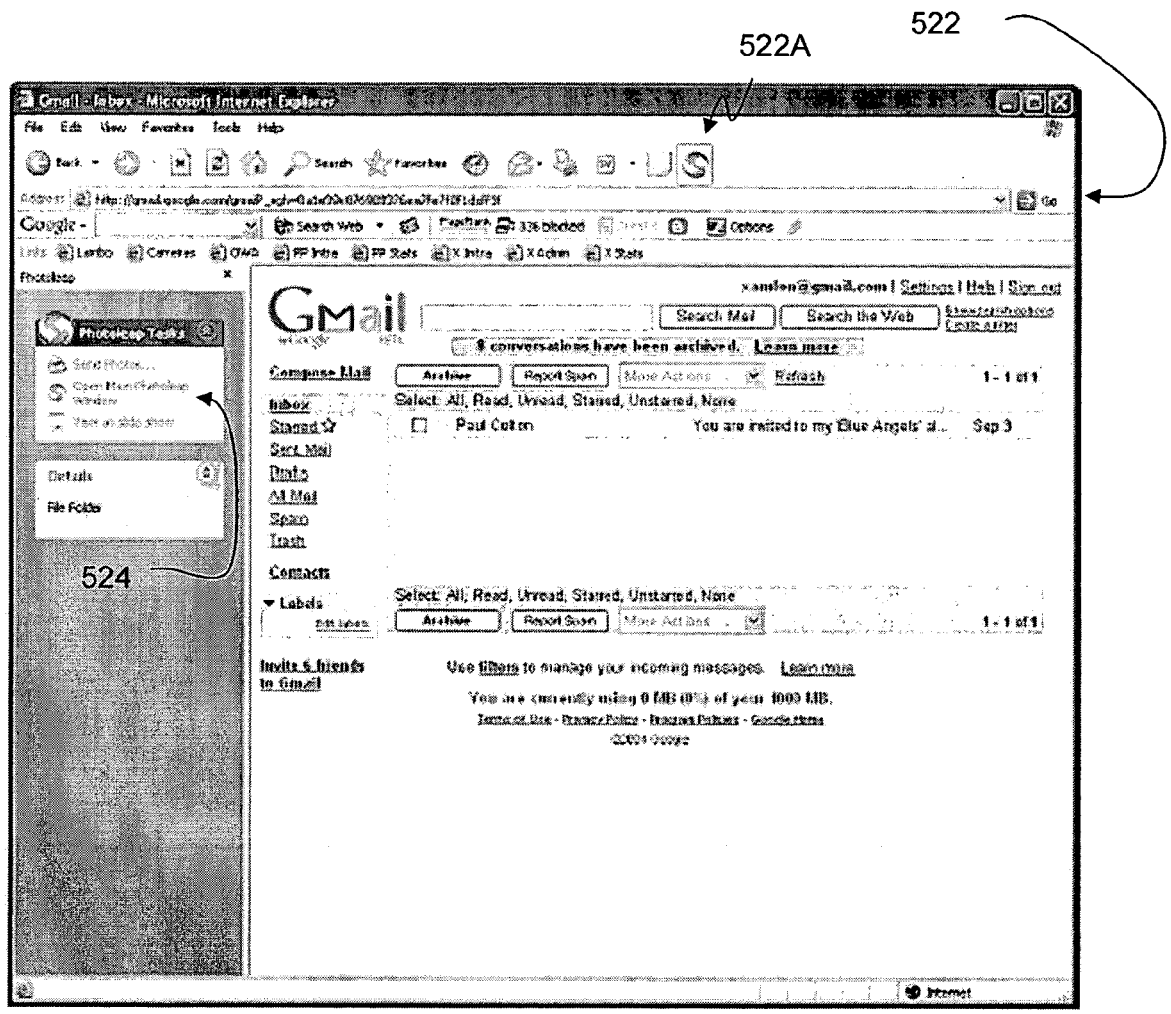
FIG. 14 is a diagram illustrating a GUI wherein the content-sharing application of the present invention is integrated with Internet Explorer in accordance with one embodiment of the invention.

The content-sharing application in accordance with various embodiments of the present invention can also be integrated with other applications such as, for example, the user's web browser. FIG. 14 is a diagram illustrating a GUI wherein the content-sharing application of the present invention is integrated with Internet Explorer. Referring now to FIG. 14, the GUI illustrated includes the various toolbars normally associated with Internet Explorer 522. Included in toolbar 522 is a content-sharing application icon 522A. Selecting this icon allows the tasks options dialog 524 to appear in the sidebar. As illustrated in FIG. 14, messages received appear in the user's in-box area 526 and can be selected and opened by the user either via the e-mail account or through the content-sharing application depending on the embodiment implemented.

Having thus described various GUIs that can be implemented in accordance with the present invention, it will become apparent to one of ordinary skill in the art after reading this discussion how to implement alternative GUI configurations to accomplish the desired features and functionality described herein. For example, although particular layouts and other look-and-feel characteristics of the GUIs have been disclosed and described, one of ordinary skill in the art will understand how to implement GUIs having alternative layouts and different look-and-feel characteristics. Likewise, the GUIs described herein are illustrated as having particular buttons and other like features to allow the user to invoke certain functionality and/or features associated with the present invention. After reading this description, it will become apparent to one of ordinary skill in the art how to implement the GUIs with these, additional, or alternative buttons, allowing access to various features and functionality as may be desired in a contemplated implementation.

As described above, the present invention can be implemented to allow users to share content 8 across a communication medium 20 in a number of different ways. For the most part, the embodiments described above illustrate implementations where a sending user initiates the creation of a message and selects one or more content items to accompany the message to the recipient user. However, implementation of the invention is not limited to these on-demand applications. Indeed, the invention can be implemented to allow automatic or semi-automatic transfer of content between users or from one user to one or more recipients. For example, in one embodiment, the invention can be implemented to allow users to maintain synchronized folders among them. Consider, for example, a young couple who have had one or more children and wish that content items relating to those children (e.g., photographs and videos) be shared with the children's grandparents. In this example, the invention can be implemented to automatically share content items stored by the couple on their computing device with the children's grandparents. For example, the content-sharing application can be implemented to automatically recognize new items added into a folder that is designated as a folder to be synchronized, and to send these new items to a designated recipient having another copy of the synchronized folder.

Figure 15:
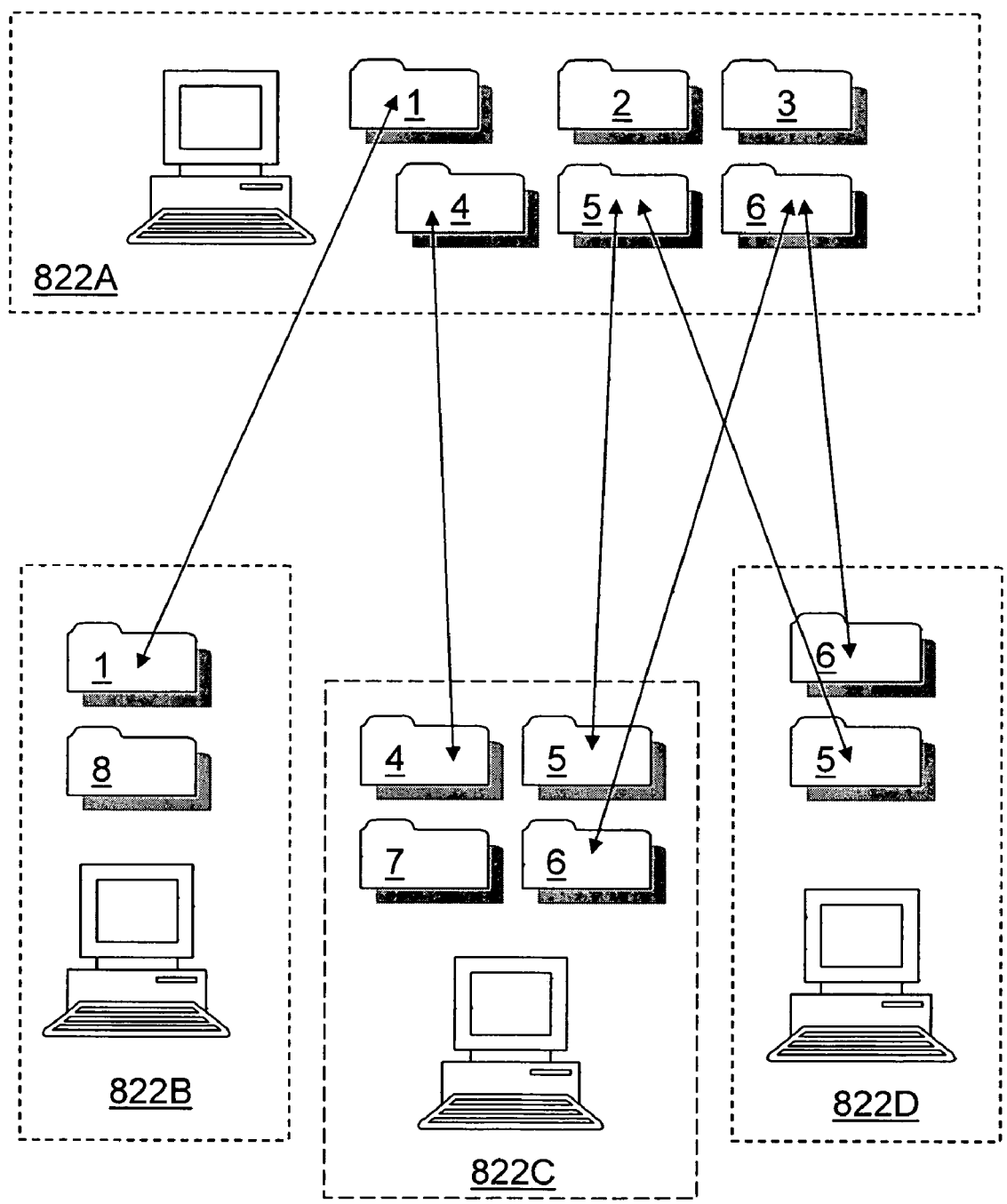
FIG. 15 is a diagram illustrating an example scenario of folder synchronization in accordance with one embodiment of the invention.

FIG. 15 is a diagram illustrating an example scenario of such folder synchronization in accordance with one embodiment of the invention. Referring now to FIG. 15, illustrated are four user parties 822. In this example, users 822A are the young couple having one or more children whose images and videos they would like to share with the grandparents. In FIG. 15, one set of grandparents is illustrated as 822B and another set of grandparents is illustrated as users 822C. Also illustrated in FIG. 15 is user 822D, who it is assumed for this example has a professional or working relationship with the mother in couple 822A. Thus, in this example, the mother in couple 822A wishes to share work related content items (files, documents, and other content) with user 822D.

Still referring to FIG. 15, in this example, folders 5 and 6 contain content items relating to the children of user 822A (the grandchildren of users 822B 822C). These content items can include, for example, family photographs, home movies, school documents, or other content items relating to the children. As stated, couple 822A wishes to share the content of folders 5 and 6 with the childrens' grandparents 822B, and 822C. Thus, in accordance with one embodiment of the invention, the content-sharing application automatically looks for additions to folders 5 and 6 made by couple 822A and provides those additions into synchronized folders 5 and 6 at grandparents 822B and grandparents 822C. This system can be configured to also provide two-way updates wherein any content captured by either or both of grandparents 822B and 822C are updated to the other folders in the synchronization family. Relationships among folders in this so called synchronization family can be set up to indicate what content items are to be shared with which folders and in which direction. Deletions, additions and other actions can be specified as a synchronization options.

The example in FIG. 15 also illustrates a folder 4 that is shared between couple 822A and one set of grandparents 822B. For example, the husband of couple 822A may share a hobby or common interest with his father, who is one of grandparents 822B. In this example, the father and son may store content related to that hobby or interest in folder 4, and designate folder 4 as a synchronized folder among them such that content additions (and deletions, etc.) can be synchronized among the folders.

Also illustrated in FIG. 15 is a folder 1 that includes work information relating to the wife in couple 822A and work she is doing with a professional affiliate 822D (for example, her business partner, employer, colleague, professor or other relationship entity). In this example, folder 1 can be a synchronized folder among users 822A and 822D can be automatically updated as a synchronization family.

Also illustrated in FIG. 15 are folders 2, 3, 7, and 8, which in this example, are not shared by any of users 822. These folders are not designated as synchronization folders and, as such, are not subject to the automatic synchronization routines described herein.

Synchronization can take place in one embodiment invisibly without interaction required by the user other than to set up or identify particular folders as part of a synchronization family. Alternatively, in another embodiment, synchronization can be accomplished by sending a message to the recipient's in-box such that the recipient of a synchronized item for a knows when content in a synchronization folder at his or her location has been updated or is ready to be updated with new content. This is useful in that it allows a recipient of synchronized content to know when to check the synchronized folder to review the new content.

In one embodiment, various rules can be established (predetermined, based upon user selection or otherwise) to govern the file synchronization operations. For example, rules may be established so as to implement the following features associated with the above-described example. These example rules can be as follows: (i) content items added to folders 5 and 6 by couple 822A are automatically added to folders 5 and 6 of the synchronization family belonging to grandparents 822C, 822D; (ii) content items added to folders 5 and 6 by grandparents 822C are automatically updated to be included in folders 5 and 6 of parents 822A; (iii) content items added to folders 5 and 6 by grandparents 822C are only selectively updated to be included in folders 5 and 6 for grandparents 822D; (iv) deletion of one or more content items from a folder 5 and 6 of the synchronization family made by any user 822A, 822C, or 822D are not automatically deleted from the other folders 5 and 6 in the synchronization family; and any other rules as me be appropriate or desirable in accordance with the synchronization objectives and system capabilities. As such, according to the above-described example rules, additions made by the parents of the grandchildren are automatically provided to both sets of grandparents, additions made by one set of grandparents are automatically provided to the parents 822A, but only optionally provided to the other set of grandparents, and finally any deletions as may be made by any members of the synchronization family are not deleted from other members' folders.

In addition to or as an alternative to designating directional or action-based rule constraints as discussed above, rule constraints can also or further be implemented based on file types. For example, one set of grandparents 822C may not have the appropriate electronic content device required to playback certain types of media such as, for example, a digital video clip. Therefore, in this example, a rule can be implemented such that digital video content added by couple 822A is not provided to this set of grandparents 822C, but is only provided to the other set of grandparents 822D as part of the synchronization mechanism. As such, once appropriate rules are implemented, the users can perform various file actions without the fear of adversely impacting another folder in this synchronization family.

After reading this description and the example rules, it will become apparent to one of ordinary skill in the art how to implement alternative schemes for providing one or more various rules to govern file synchronization among file synchronization families. Furthermore, although the synchronization feature of the present invention was discussed herein in terms of example implementations and example relationships among the parties with whom folders are synchronized, it will become apparent to one of ordinary skill in the art after reading this description how to implement the invention with a variety of different synchronization schemes.

Various embodiments of the invention and implementation examples have been described above. However, it is understood that these various embodiments and examples are for illustrative purposes only and should not serve to limit the scope of the invention. It is also readily understood by those of ordinary skill in the art after reading this discussion how to design, implement and utilize the disclosed embodiments with alternative architectures, processes, functionality, structures, and implementations. In sum, based on the teachings contained herein, additional embodiments as well as various modifications of, and alternatives to, the embodiments described above can be implemented by those of ordinary skill in the art, without undue experimentation. Thus, the breadth and scope of the present invention should not be limited by any of the above-described exemplary embodiments, but should be defined only in accordance with the following claims and their equivalents.

The invention claimed is:

1. A method for transmitting an electronic mail message with an original media content, the method comprising:
    encoding the original media content at a sender's computing device with a first level of encoding to compress the original media content to create a compressed media content, the original media content comprising at least two elements of a plurality of elements comprising digital photo, digital audio, digital text and digital video;
    identifying the at least two elements of a plurality of elements comprising digital photo, digital audio, digital text and digital video;
    encoding the compressed media content with a plurality of content specific encoding specific to the identified at least of two of the plurality of elements comprising digital photo, digital audio, digital text and digital video to further compress the compressed media content to create a content-specific compressed media content;
    transferring the content-specific compressed media content from the sender's computing device across a communication medium, the communication medium selected from the group of Internet, an intranet network and a extranet network;
    receiving the content-specific compressed media content across the communication medium at a recipient's computing device;
    decoding the content-specific compressed media content at the recipient's computing device with a content-specific decoding to recreate the compressed media content; and
    decoding the compressed media content with a first level decoding to generate the original media content for opening at the recipient's computing device.

2. A method for transmitting an electronic mail message with an original media content, the method comprising:
    encoding the original media content at a sender's computing device with a first level of encoding to compress the original media content to create a compressed media content, the original media content comprising at least two elements of a plurality of elements comprising digital photo, digital audio, digital text and digital video;
    identifying the at least two elements of a plurality of elements comprising digital photo, digital audio, digital text and digital video;
    encoding the compressed media content with a plurality of content specific encoding specific to the identified at least of two of the plurality of elements comprising digital photo, digital audio, digital text and digital video to further compress the compressed media content to create a content-specific compressed media content;
    transferring the content-specific compressed media content from the sender's computing device to a server;
    transferring an email message from the server across a communication medium to an email server, the communication medium selected from the group of Internet, an intranet network and a extranet network;
    transferring the email message from the email server to a recipient's computing device, the email message informing a recipient that a transfer of the content-specific compressed media content is forthcoming from the server;
    transferring the content-specific compressed media content from the server across the communication medium to the recipient's computing device;
    decoding the content-specific compressed media content at the recipient's computing device with a content-specific decoding to recreate the compressed media content; and
    decoding the compressed media content with a first level decoding to generate the original media content for opening at the recipient's computing device.

3. The method according to claim 2 wherein transferring the content-specific compressed media content from the server across the communication medium to the recipient's computing device comprises pulling the content-specific compressed media content from the server.

* * * * *